(12) United States Patent
Nakamura

(10) Patent No.: US 11,829,061 B2
(45) Date of Patent: Nov. 28, 2023

(54) IMAGE DISPLAY DEVICE

(71) Applicant: Sony Corporation, Tokyo (JP)

(72) Inventor: Tomoharu Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 309 days.

(21) Appl. No.: 17/274,352

(22) PCT Filed: Aug. 27, 2019

(86) PCT No.: PCT/JP2019/033516
§ 371 (c)(1),
(2) Date: Mar. 8, 2021

(87) PCT Pub. No.: WO2020/050098
PCT Pub. Date: Mar. 12, 2020

(65) Prior Publication Data
US 2022/0050371 A1     Feb. 17, 2022

(30) Foreign Application Priority Data

Sep. 7, 2018   (JP) .................................. 2018-168325

(51) Int. Cl.
  *G03B 21/60*   (2014.01)
  *G02B 5/18*   (2006.01)
  (Continued)

(52) U.S. Cl.
CPC ........... *G03B 21/60* (2013.01); *G02B 5/1842* (2013.01); *G02B 5/32* (2013.01); *G03B 21/10* (2013.01);
(Continued)

(58) Field of Classification Search
CPC ........ G03B 21/10; G03B 21/28; G03B 21/60; G03B 21/62; G03B 21/145; G03H 1/0244;
(Continued)

(56) References Cited

U.S. PATENT DOCUMENTS

| 5,024,521 A | * | 6/1991 | Zuchowski | .......... G03B 21/606 |
| | | | | 348/E13.058 |
| 6,644,816 B1 | * | 11/2003 | Perra | ....................... G09F 19/18 |
| | | | | 349/5 |
| 2005/0041218 A1 | * | 2/2005 | Hoshino | ................. G09F 19/14 |
| | | | | 353/94 |
| 2007/0211227 A1 | * | 9/2007 | Era | ........................ G03B 35/18 |
| | | | | 348/E5.137 |

(Continued)

FOREIGN PATENT DOCUMENTS

| JP | H09-033856 A | 2/1997 |
| JP | 2003-035933 A | 2/2003 |

(Continued)

OTHER PUBLICATIONS

International Search Report dated Nov. 26, 2019 in connection with PCT/JP2019/033516.

*Primary Examiner* — Sultan Chowdhury
(74) *Attorney, Agent, or Firm* — K&L Gates LLP

(57) ABSTRACT

An image display device according to an aspect of the present technology includes an emission portion, a transparent base material, an irradiation target, and an optical portion. The emission portion emits image light along a predetermined axis. The transparent base material includes a tapered surface having a tapered shape along the predetermined axis. The irradiation target is disposed at least a part around the predetermined axis along the tapered surface. The optical portion controls an incident angle of the image light on the irradiation target, the image light having been emitted from the emission portion, the optical portion being disposed in a manner that the optical portion faces the emission portion on the basis of the predetermined axis.

16 Claims, 11 Drawing Sheets

(51) Int. Cl.
*G02B 5/32* (2006.01)
*G03B 21/28* (2006.01)
*G03H 1/02* (2006.01)
*G03B 21/10* (2006.01)
*G03B 21/62* (2014.01)
*G09F 9/30* (2006.01)

(52) U.S. Cl.
CPC ............ *G03B 21/28* (2013.01); *G03B 21/62* (2013.01); *G03H 1/0244* (2013.01); *G03H 1/0248* (2013.01); *G09F 9/30* (2013.01)

(58) Field of Classification Search
CPC ...... G03H 1/0248; G03H 1/0272; G02B 5/02; G02B 5/08; G02B 5/10; G02B 5/32; G02B 5/0284; G02B 5/1842; G02B 5/1876

See application file for complete search history.

(56) References Cited

U.S. PATENT DOCUMENTS

| | | | |
|---|---|---|---|
| 2013/0033650 A1* | 2/2013 | Roberts | G03B 37/06 353/69 |
| 2014/0198949 A1* | 7/2014 | Garlington | G09F 19/22 382/103 |
| 2017/0192388 A1* | 7/2017 | Kitamura | G03B 21/60 |
| 2017/0233582 A1* | 8/2017 | Zhao | C09D 5/006 353/77 |
| 2019/0250332 A1* | 8/2019 | Cippant | G02F 1/13336 |

FOREIGN PATENT DOCUMENTS

| | | |
|---|---|---|
| JP | 2003-344962 A | 12/2003 |
| JP | 2004-012477 A | 1/2004 |
| JP | 2007-025207 A | 2/2004 |
| JP | 2006-308745 A | 11/2006 |
| JP | 2013-097258 A | 5/2013 |
| JP | 2016-161691 A | 9/2016 |

\* cited by examiner

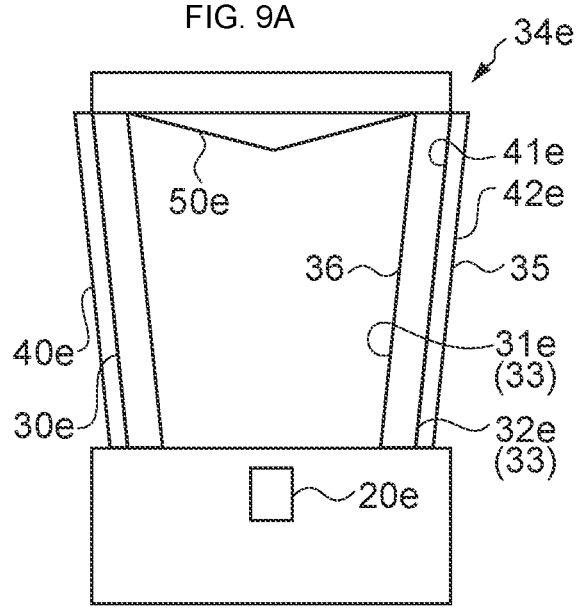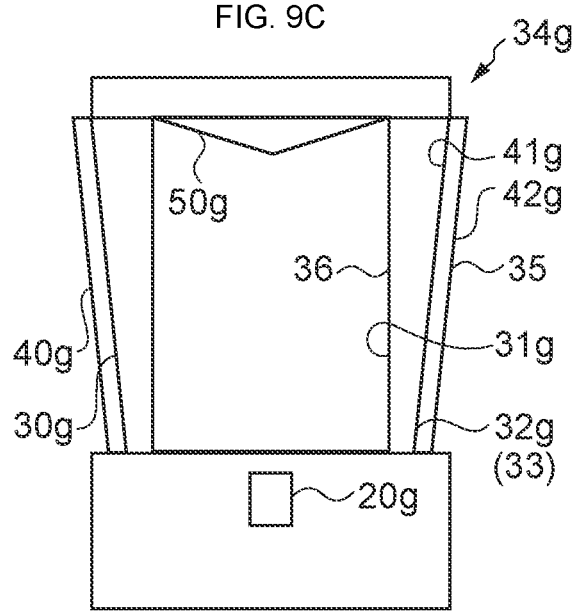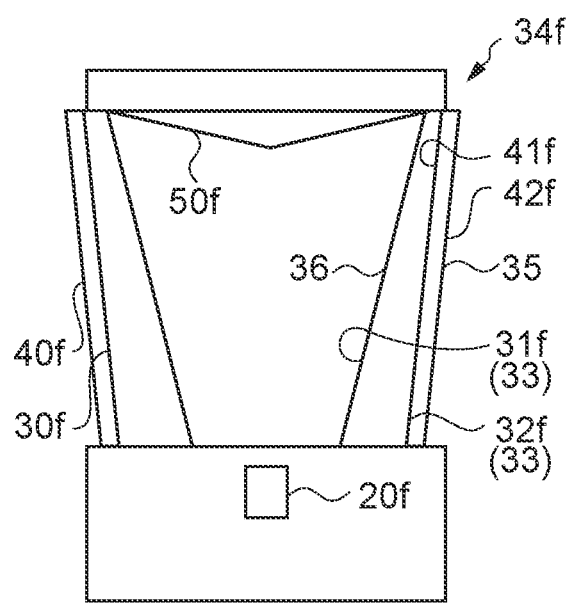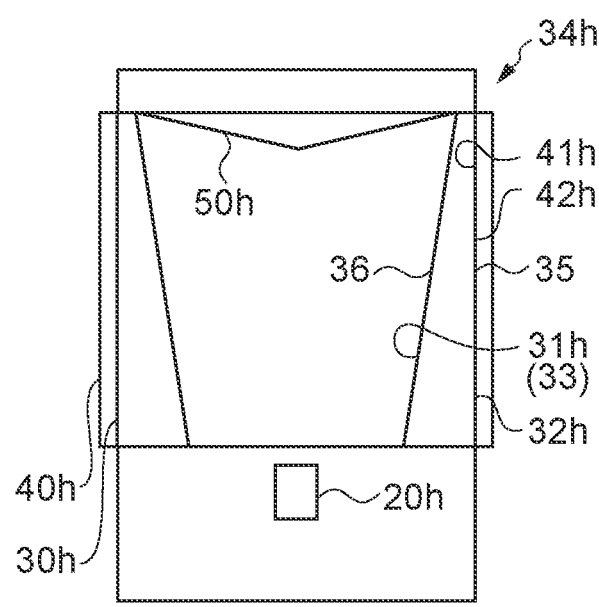

IMAGE DISPLAY DEVICE

TECHNICAL FIELD

The present technology relates to an image display device that displays an image on a screen or the like.

BACKGROUND ART

Conventionally, technologies of projecting images on a screen or the like having various kinds of shape, have been developed. For example, by projecting an image on the side surface of a cylindrical screen, it is possible to enjoy a whole circumference image that is a 360-degree image displayed omnidirectionally.

Patent Literature 1 describes a whole circumference video forming device for displaying a video on a whole circumference screen having a rotation body shape. With regard to the whole circumference video forming device according to Patent Literature 1, a rotation body reflection mirror is disposed on a ceiling of the whole circumference screen in a manner that a convex surface faces downward. Projection light emitted from a video projection portion that is below the whole circumference screen is reflected by the rotation body reflection mirror toward the whole circumference of the whole circumference screen. This makes it possible to display the video three-dimensionally. (See paragraphs [0025], [0033], [0040], FIG. 1, and the like of Patent Literature 1).

CITATION LIST

Patent Literature

Patent Literature 1: JP 2004-12477A

DISCLOSURE OF INVENTION

Technical Problem

Such technologies of displaying an image on a whole circumference screen are expected to be applied to wide fields such as advertising and amusement. Therefore, technologies capable of displaying a high-quality image have been desired.

In view of the circumstances as described above, a purpose of the present technology is to provide an image display device capable of displaying a high-quality image on a whole circumference screen or the like.

Solution to Problem

To accomplish the above-described purpose, an image display device according to an aspect of the present technology includes an emission portion, a transparent base material, an irradiation target, and an optical portion.

The emission portion emits image light along a predetermined axis.

The transparent base material includes a tapered surface having a tapered shape along the predetermined axis.

The irradiation target is disposed at least a part around the predetermined axis along the tapered surface.

The optical portion controls an incident angle of the image light on the irradiation target, the image light having been emitted from the emission portion, the optical portion being disposed in a manner that the optical portion faces the emission portion on the basis of the predetermined axis.

When using this image display device, image light emitted from the emission portion along the predetermined axis is incident on the optical portion that faces the emission portion. The optical portion controls an incident angle of the image light emitted from the emission portion, with respect to the irradiation target. The irradiation target is disposed at least a part around the predetermined axis along the tapered surface of the transparent base material. By disposing the tapered surface, it is possible to improve quality of display, and it possible to display a high-quality image on a whole circumference screen or the like.

The transparent base material may have a first surface that is on a side of the predetermined axis, and a second surface that is on a side opposite to the first surface. In this case, the tapered surface may be formed on at least one of the first surface or the second surface.

Since the first surface is the tapered surface, it is possible to suppress uneven luminance and the like of the displayed image, for example. In addition, since the second surface is the tapered surface, it is possible to reduce an effect of reflection of outside light, for example. This makes it possible to display the high-quality image.

The transparent base material may support the irradiation target.

This makes it possible to easily configure a transparent whole circumference screen or the like, for example.

The irradiation target may be disposed on at least one of the first surface or the second surface.

This makes it possible to dispose the irradiation target to fit a surface shape of the transparent base material, for example, and it is possible to easily reduce uneven luminance of the image, reflection of outside light, and the like.

The tapered surface may have a first tapered shape in a manner that the tapered surface expands along a direction from the emission portion toward the optical portion.

For example, this makes it possible to easily suppress effects of the uneven luminance of the image, reflection of outside light, and the like.

The transparent base material may be configured in a manner that both the first surface and the second surface are the tapered surfaces having the first tapered shape.

For example, this makes it possible to suppress the uneven luminance of the image, and suppress effects of reflection of outside light and the like. As a result, it is possible to display a sufficiently-high-quality image.

The first tapered shape may be a linear tapered shape. In this case, a taper angle of the first surface may be set to an angle similar to a taper angle of the second surface.

This makes it possible to configure the transparent base material uniform thickness. For example, it is possible to improve transparency or the like of a screen and provide an excellent feeling of floating.

The first tapered shape may be a linear tapered shape. In this case, a taper angle of the first surface may be set to an angle different from a taper angle of the second surface.

For example, this makes it possible to improve stiffness or the like of the transparent base material main body, and it is easily manufacture the transparent base material.

The transparent base material may be configured in a manner that one of the first surface and the second surface is the tapered surface having the first tapered shape.

For example, this makes it possible to improve stiffness or the like of the transparent base material main body, and it is easily manufacture the transparent base material.

The optical portion may include a reflection surface that reflects the image light toward the irradiation target, the image light having been emitted from the emission portion.

For example, this makes it possible to sufficiently suppress the effects of the uneven luminance of the image, reflection of outside light, and the like, and it is possible to display a sufficiently-high-quality image.

The tapered surface may have a second tapered shape in a manner that the tapered surface narrows along a direction from the emission portion toward the optical portion.

For example, this makes it possible to reduce the uneven luminance of the image, and improve brightness and the like of the image.

The optical portion may include a refractive surface that refracts the image light emitted from the emission portion and emits the refracted light toward the irradiation target.

For example, this makes it possible to display a bright image with less uneven luminance, and achieve high-quality image display.

The optical portion may set the incident angle of the image light on the irradiation target to be substantially fixed.

Therefore, the irradiation target is irradiated with image light at a substantially fixed incident angle. As a result, it is possible to display a high-quality image on a whole circumference screen.

The irradiation target may be disposed over a circumference around the predetermined axis.

Therefore, the whole circumference screen surrounds the predetermined axis, and it is possible to enjoy a whole circumference image and the like.

The irradiation target may be a screen using a diffractive optical element.

By using the diffractive optical element, it is possible to display a sufficiently-high-quality image.

The irradiation target may be a sheet-like hologram screen.

This makes it possible to easily configure a whole circumference screen or the like.

The irradiation target may be one of a volume hologram screen obtained by exposing photosensitive material applied to the transparent base material, and a relief hologram screen obtained by processing the transparent base material.

This makes it possible to accurately form a desired hologram on the transparent base material.

The irradiation target may be a Fresnel screen.

By using the Fresnel screen, it is possible to display a sufficiently-high-quality image.

Advantageous Effects of Invention

As described above, according to the present technology, it is possible to display a high-quality image on a whole circumference screen or the like. Note that, the effects described herein are not necessarily limited and may be any of the effects described in the present disclosure.

BRIEF DESCRIPTION OF DRAWINGS

FIG. 9 is a FIGS. 9A to 9D are schematic diagrams illustrating configuration examples of an external tapered screen.

MODE(S) FOR CARRYING OUT THE INVENTION

Hereinafter, embodiments of the present technology will be described with reference to the drawings.

First Embodiment

[Configuration of Image Display Device]

Figure 1:
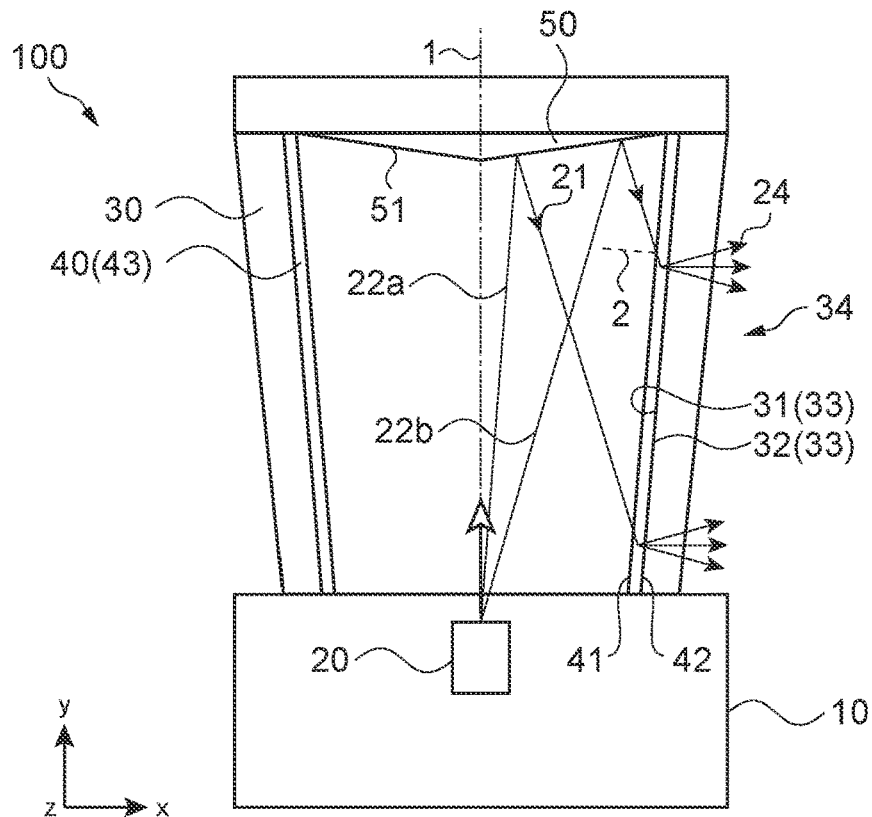
FIG. 1 is a cross-sectional view of a configuration example of an image display device according to a first embodiment of the present technology.

FIG. 1 is a cross-sectional view of a configuration example of an image display device according to a first embodiment of the present technology. In this embodiment, the description will be given on the assumption that a horizontal direction is a direction of a surface (XZ plane) on which the image display device 100 is disposed, and an up-down direction is a direction (Y direction) that is perpendicular to the horizontal direction.

The image display device 100 includes a base 10, an emission portion 20, a transparent base material 30, a screen 40, and a reflection mirror 50.

The base 10 has a cylindrical shape, and the base 10 is disposed at a bottom of the image display device 100. On the base 10, an electric power supply source such as a battery, a speaker, other elements that are necessary to operate the image display device 100, a sensing device for performing a recognition process such as speech recognition or image recognition are appropriately disposed, but they are not illustrated in the drawings. The shape and the like of the base 10 are not limited. For example, the base 10 has any shape such as a rectangular cuboid shape.

The emission portion 20 is disposed at a substantially center of the cylindrical base 10 in a manner that the emission portion 20 faces upward. The emission portion 20 emits image light 21 along an optical axis 1 that extends in the up-down direction (Y direction). The image light 21 includes light (light beams) for displaying respective images, for example. According to the embodiment, the optical axis 1 corresponds to a predetermined axis.

FIG. 1 illustrates a cross section of the image display device 100 taken along any surface direction including the optical axis 1. The emission portion 20 radially emits the image light 21 along the optical axis 1 toward the top of the image display device 100. Therefore, as illustrated in FIG. 1, the emission portion 20 emits the image light 21 at a predetermined angle of view on any plane including the optical axis 1. FIG. 1 schematically illustrates an inner optical path 22a that has a small emission angle and is near the optical axis 1, and an outer optical path 22b that has a large emission angle and that is distant from the optical axis 1. Here, the emission angle means an angle between the optical axis 1 and an optical path of light corresponding to each pixel of the image light 21, for example.

As the emission portion 20, a laser scanning color projector or the like is used, for example. The laser scanning color projector scans laser light beams corresponding to respective colors including R, G, and B and displays respective pixels. The specific configuration of the emission portion 20 is not limited. For example, a small mobile projector (pico projector), a projector using monochromatic laser light, or the like may be appropriately used in accordance with the size, use, and the like of the image display device 100. Alternatively, it is also possible to use any projector that is capable of projecting the image light 21.

For example, as the emission portion 20, a projection device (projector) may be appropriately used. The projection device (projector) includes a light-emitting element and a light-modulating element. The light-emitting element uses a laser diode (LD), a light emitting diode (LED), or the like. The light-modulating element uses microelectromechanical systems (MEMS), the digital micro mirror device (DMD), reflective liquid crystals, transmissive liquid crystals, or the like. In other words, it is possible to use a projection device or the like that includes structural elements such as an LD+MEMS, an LD+DMD, an LD+reflective liquid crystals, an LD+transmissive liquid crystals, an LED+MEMS, an LED+DMD, an LED+reflective liquid crystals, or an LED+ transmissive liquid crystals. Of course, the present technology is applicable even in the case of using a projection device including another structural elements.

The transparent base material 30 has a tubular shape that is rotationally symmetric about the optical axis 1, and is connected to the top of the base 10. In addition, a reflection mirror 50 (to be described later) is connected to the top of the transparent base material 30. Note that, in the present disclosure, the shape that is rotationally symmetric about the optical axis 1 includes a solid of revolution about the optical axis 1, which serves as a substantially central axis, and the like. The transparent base material 30 has a first surface 31 that is on a side of the optical axis 1, and a second surface 32 that is on a side opposite to the first surface 31.

The first surface 31 is an inner periphery of the tubular transparent base material 30. In the example illustrated in FIG. 1, the screen 40 (to be described later 9 is provided on the first surface 31. In other words, the transparent base material 30 supports the screen 40. As described above, the transparent member 30 functions as a supporting member that supports the screen 40.

The second surface 32 is an outer periphery of the tubular transparent base material 30. In the example illustrated in FIG. 1, the second surface 32 is a side surface (outermost surface) of the image display device 100. Therefore, outside light (such as illumination light and sunlight) is incident on the second surface 32 from an outside of the image display device 100 (see FIG. 3).

The transparent base material 30 includes a tapered surface 33 having a tapered shape along the optical axis 1. In other words, it can be said that the transparent base material 30 is a tapered cylinder that is tapered. In the example illustrated in FIG. 1, the transparent base material 30 is configured in a manner that both the first surface 31 and the second surface 32 are tapered surface 33. In other words, the tapered surfaces 33 are formed on the first surface 31 and the second surface 32. Therefore, the transparent base material 30 has a tubular shape with a tapered outer surface and a tapered inner surface.

In the embodiment, the tapered surfaces 33 have a first tapered shape in a manner that the tapered surfaces 33 expand along a direction from the emission portion 20 toward the reflection mirror 50. Here, the direction from the emission portion 20 toward the reflection mirror 50 is a direction from bottom to top of the image display device 100 (positive direction along Y axis). Typically, this direction is an emission direction of the image light 21. In FIG. 1, an outline arrow schematically indicates the upward direction.

For example, as illustrated in FIG. 1, the first surface 31 has a radius that continuously expands toward the upward direction of the device on a cross-section (XY plane) including the optical axis 1. Therefore, the tapered surface 33 formed on the first surface 31 has the first tapered shape in a manner that the tapered surface 33 expands upward. In addition, the second surface 32 has a radius that continuously expands toward the upward direction of the device on the cross-section including the optical axis 1. Therefore, the tapered surface 33 formed on the second surface 32 has the first tapered shape in a manner that the tapered surface 33 expands upward.

As described above, in the example illustrated in FIG. 1, the transparent base material 30 is configured in a manner that both the first surface 31 and the second surface 32 are tapered surface 33 having the first tapered shape. Note that, as illustrated in FIG. 1, it can be said that the first tapered shape may be a downward tapered shape (inverse tapered shape) in a manner that a tip of the tapered shape is directed toward the bottom of the image display device 100.

In addition, as illustrated in FIG. 1, a cross-section of each tapered surface 33 is a straight line on the cross-section (XY plane) including the optical axis 1. Therefore, for example, the radius of each tapered surface 33 linearly increases toward the top of the image display device 100. As described above, the first tapered shape is a linear tapered shape. In other words, the tapered surface 33 consists of a curved surface (conical surface) obtained by rotating a straight line disposed near the optical axis 1 around the optical axis 1.

With regard to the transparent base material 30 illustrated in FIG. 1, a taper angle of the first surface 31 is set to an angle similar to a taper angle of the second surface 32. Here, the taper angle is an angle between a central axis (optical axis 1) and a straight line indicating a cross-sectional shape of the tapered surface 33 on the cross section including the central axis (optical axis 1) of the tapered surface 33, for example. Therefore, the taper angle is an angle representing a degree of slope to the optical axis 1 of the tapered surface 33 (or cross-section thereof).

In the case where the first surface 31 and the second surface 32 have the same taper angle, respective surface including the optical axis 1 are straight lines that are parallel to each other. In other words, the transparent base material 30 has even thickness as a whole. This allows a user viewing the transparent base material 30 (image display device 100) to watch a transparent screen regardless of change in thickness of the transparent base material 30 or the like.

The specific shapes of the tapered surfaces 33 are not limited. For example, instead of the linear tapered shape, it is also possible to use any tapered shape such as an exponential tapered shape, a parabolic tapered shape, or a hyperbolic tapered shape as the first tapered shape. In the exponential tapered shape, the cross-sectional shape including the central axis (optical axis 1) is an exponential function. In the parabolic tapered shape, the cross-sectional shape is a parabola. In the hyperbolic tapered shape, the cross-sectional shape is a hyperbola.

In addition, it is also possible to configure the tapered surfaces 33 in a manner that the first surface 31 and the second surface 32 have different taper angles, or in a manner that the tapered surface 33 is formed on one of the first surface 31 and the second surface 32. Details of such other configurations will be described later.

For example, transparent resin material or the like such as resin material is suitable for material for the transparent base material 30. In addition, the transparent base material 30 is formed through injection molding, for example. By tapering the transparent base material 30, it is possible to improve ease of release at a time of injection molding, to shorten takt time at a time of manufacturing the transparent base material 30, and reducing manufacturing cost. In addition, for example, it is possible to lighten the transparent base material 30 by using the resin material.

In addition, the material for the transparent base material 30, the molding method, and the like are not limited. For example, any resin material, glass material, or the like may be appropriately used for the material for the transparent base material 30 as long as the material is capable of transmitting visible light. In addition, for example, the transparent base material 30 may be formed of transparent material with sufficiently high transmittance, translucent material with predetermined transmittance (such as 30%, for example), or the like. In addition, instead of the injection molding, it is also possible to form the transparent base material 30 through cutting, a 3D printer, or the like, for example.

The screen 40 is disposed over the circumference around the optical axis 1 along the tapered surfaces 33 of the transparent base material. Therefore, the screen 40 serves as a whole circumference screen disposed around the optical axis 1. For example, the screen 40 is directly provided on the tapered surfaces 33 of the transparent base material 30. Alternatively, the screen 40 may be provided besides the tapered surface 33. In this embodiment, the screen 40 corresponds to an irradiation target.

The screen 40 has a third surface 41 that is on a side of the optical axis 1, and a fourth surface 42 that is on a side opposite to the third surface 41. In other words, the third surface 41 is an inner periphery of the screen 40, and the fourth surface 42 is an outer periphery of the screen 40. In the example illustrated in FIG. 1, the screen 40 is disposed on the first surface 31. Specifically, the screen 40 is disposed in a manner that the first surface 31 inside the transparent base material 30 is in contact with the fourth surface 42 outside the screen 40.

As described above, the first surface 31 of the transparent base material 30 illustrated in FIG. 1 is a tapered surface 33 that is rotationally symmetric about the optical axis 1. Therefore, the screen 40 has a tapered shape that is rotationally symmetric about the optical axis 1 serving as the central axis (first tapered shape). As described above, in the embodiment, the screen 40 is provided in a manner that the central axis of the screen 40 is identical to the optical axis 1 of the emission portion 20.

The screen 40 includes an optical function for displaying an image, and is formed of light transmissive material. Therefore, by providing the screen 40 on the transparent base material 30, it is possible to configure a transparent display member (transparent screen) that has the tapered surfaces 33 in a manner that a background can be seen through it.

Hereinafter, the display member including the transparent base material 30 and the screen 40 is referred to as a tapered screen 34. The image display device 100 is configured in a manner that the transparent tapered screen 34 is connected to the top of the base 10.

In the embodiment, the screen 40 is a screen using a diffractive optical element. The diffractive optical element (DOE) is an optical element for diffracting light. For example, a holographic optical element (HOE) or the like for diffracting light by using an interference pattern recorded on a hologram is used as the diffractive optical element.

In the embodiment, a transmissive hologram 43 (transmissive HOE) is used as the diffractive optical element. The transmissive hologram 43 is a hologram that controls propagation directions of light incident from one surface and emits the light from the other surface. For example, light incident from the inside (third surface 41) of the screen 40 is emitted toward the outside (fourth surface 42) of the screen 40. This allows the screen 40 to serve as the transmissive screen that transmits the image light 21.

Figure 2:
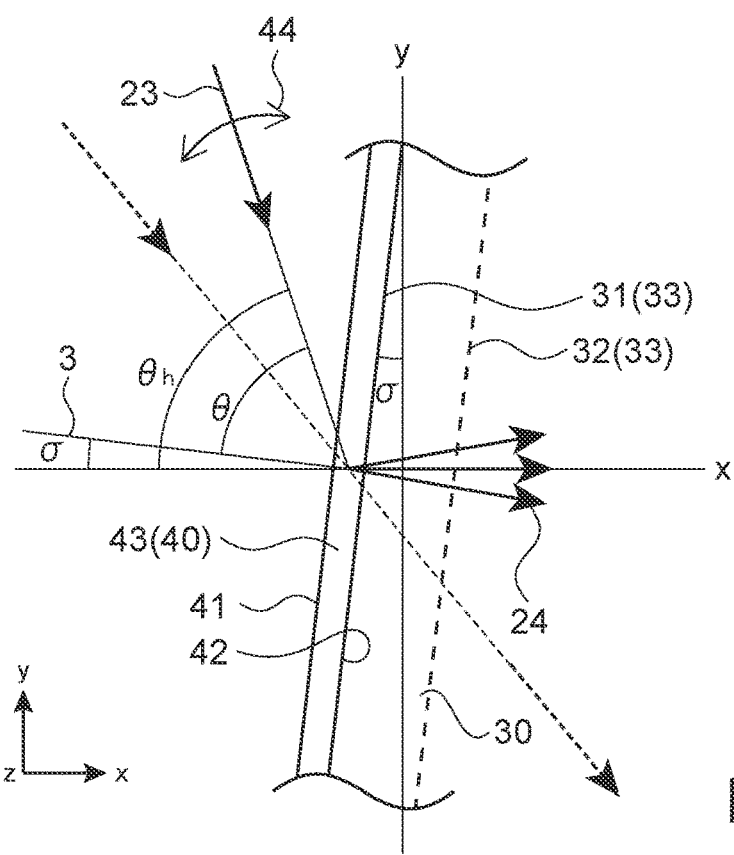
FIG. 2 is a schematic diagram illustrating a configuration example of a transmissive hologram.

FIG. 2 is a schematic diagram illustrating a configuration example of the transmissive hologram 43. FIG. 2 schematically illustrates a cross-section of the transmissive hologram 43 (screen 40) provided on the first surface 31 of the transparent base material 30 illustrated in FIG. 1. For example, on the transmissive hologram 43, an interference pattern of diffused light created through a diffuser panel is recorded. The transmissive hologram 43 has a diffusion function of diffracting the incident light 23 (image light 21) and emitting the diffused light as diffused light 24. As described above, by emitting the diffused light 24, it is possible to display an image on the transmissive hologram 43 (screen 40).

FIG. 2 schematically illustrates the incident light 23 and the diffused light 24. The incident light 23 is incident on the transmissive hologram 43 at an incident angle $\theta=\theta_0$. The diffused light 24 is generated by diffracting the incident light 23. Here, the incident angle $\theta$ is an angle between an optical path of the incident light 23 and a normal of the transmissive hologram 43 obtained at the incident position of the incident light 23 (hereinafter, referred to as interface normal 2), for example. For example, incident light 23 that is vertically incident on the transmissive hologram 43 has an incident angle of 0°.

Note that, as illustrated in FIG. 2, in the case where the transmissive hologram 43 (screen 40) is formed on the tapered surface 33, the transmissive hologram 43 is disposed in a manner that the transmissive hologram 43 is tilted at a taper angle $\sigma$ with respect to the up-down direction (Y direction) of the image display device 100.

Therefore, an angle between the interface normal 2 of the transmissive hologram 43 and a horizontal direction (X direction in FIG. 2) is the taper angle $\sigma$. Accordingly, an angle $\theta_h$ between the optical path of the incident light 23 and the horizontal direction (hereinafter, referred to as horizontal incident angle $\theta_h$) is represented as $\theta_h=\theta+\sigma$. For example, in the case where the transmissive hologram 43 is provided on a cylinder surface instead of the tapered surface 33 or other cases, the incident angle $\theta$ is identical to the horizontal incident angle $\theta_h$.

The transmissive hologram 43 is configured to diffract the incident light 23 that in incident on the third surface 41 at an incident angle $\theta_0$ and emit diffused light 24 from the fourth surface 42. Therefore, it can be said that the third surface 41 of the transmissive hologram 43, that is, the inner periphery of the screen 40 functions as a diffusion surface that diffuses light incident at the incident angle $\theta_0$.

In the example illustrated in FIG. 2, the transmissive hologram 43 is configured to generate the diffused light 24 that diffuses around the horizontal direction (X direction). This makes it possible to display a proper image for a user viewing the image display device 100 from the horizontal direction. In addition, an emission direction of the diffused light 24 and the like are not limited. For example, the direction may be appropriately set in accordance with the uses and the like of the image display apparatus.

Note that, a diffraction efficiency of the transmissive hologram 43 has angle distribution (peak structure) in a manner that a peak value is obtained at a predetermined incident angle θ, for example. Here, the diffraction efficiency is an amount representing a rate of incident light 23 diffracted by the transmissive hologram 43. In addition, sometimes the angle distribution of the diffraction efficiency exhibits wavelength dependency in accordance with wavelength of the incident light 23.

Therefore, the transmissive hologram 43 is appropriately configured in a manner that respective color light beams incident at the incident angle $θ_0$ are diffracted in right balance with high efficiency, for example. For example, the transmissive hologram 43 is configured to be capable of appropriately displaying a color image by using the image light 21 incident at the incident angle $θ_0$.

In addition, it is also possible to set a diffraction angle range 44 or the like on the basis of characteristics or the like of the diffraction efficiency of the transmissive hologram 43 in a manner that the diffraction efficiency is a predetermined criterion value (such as 20% or 10%, for example) or more. In other words, the incident light 23 that is incident at the incident angle θ, which falls within the diffraction angle range 44, is diffracted at a rate of at least the predetermined criterion value or more and is converted into the diffused light 24. For example, it is possible to set various parameters of the transparent base material 30, the reflection mirror 50, and the like of the image display device 100 in accordance with the diffraction angle range 44. Such methods may be used.

Note that, other light (indicated by dotted arrow in FIG. 2) incident on the third surface 41 at an incident angle θ that is out of the diffraction angle range 44 is hardly diffracted, and passes through the transmissive hologram as it is. As described above, the transmissive hologram 43 exhibits high incident angle selectivity in a manner that the transmissive hologram 43 diffracts or transmits the incident light 23 depending on the incident angle θ.

For example, as the hologram, it is possible to use material such as photopolymers (photosensitive material or the like) or UV curable resin. By appropriately recording the interference pattern on such material, it is possible to configure a hologram having desired optical functions. In addition, to record the interference pattern, a volume hologram, a relief hologram, or the like is used. The volume hologram forms the interference pattern by using change in refractive index in the material, and the relief hologram forms the interference pattern by using the concave-convex surface of the material, for example.

For example, the screen 40 is a sheet-like hologram screen, and is configured by a hologram film. The hologram film is thin film-like material. For example, the hologram film includes a base film or the like to which photopolymers (photosensitive material) are applied.

The hologram film is exposed via the interference pattern by attaching the hologram film to a substrate having high flatness such as glass, for example. The tapered screen 34 is obtained by removing the hologram film on which the interference pattern is recorded from the substrate, and attaching the hologram film to transparent base material 30. As described above, by using the sheet-like hologram screen, it is possible to easily form the screen 40 on the transparent base material 30, and easily obtain the tapered screen 34.

In addition, the screen 40 may be the volume hologram screen obtained by exposing photosensitive material applied to the transparent base material 30. For example, the photopolymers are directly applied to a surface of the transparent base material 30. It is possible to expose the photopolymers via the interference pattern in a state where the photopolymers are applied to the transparent base material 30. Therefore, the base film is not necessary, and it is possible to reduce the number of parts. In addition, the attachment process is not necessary, and it is possible to simplify the manufacturing procedure. Therefore, it is possible to suppress cost and the like of manufacturing the tapered screen 34.

In addition, the screen 40 may be the relief hologram screen obtained by processing the transparent base material 30. For example, a predetermined interference pattern is obtained by forming a concave-convex surface of the transparent base material 30 through pressing or the like. This makes it possible to configure the relief (embossed) hologram. As described above, the surface of the transparent base material 30 is directly processed. Therefore, it is not necessary to use the photopolymers or the like, and it is possible to reduce manufacturing cost. In addition, for example, it is not necessary to perform the exposure process, and it is possible to sufficiently shorten manufacturing time of tapered screen 34.

In addition, the specific configuration of the screen 40 (transmissive hologram 43) is not limited. For example, as the screen 40, it is possible to use a diffractive optical element or the like for diffracting light by using a predetermined diffraction grating pattern or the like, instead of the interference pattern.

The reflection mirror 50 is connected to the tops of the transparent base material 30 and the screen 40 (tapered screen 34). The reflection mirror 50 includes a reflection surface 51 that reflects the image light 21 emitted from the emission portion 20, toward the screen 40. The reflection mirror 50 is disposed in a manner that the reflection surface 4151 faces the emission portion 20 on the basis of the optical axis 1.

The image light 21 incident on the reflection mirror 50 is reflected by the reflection surface 51, and is emitted toward the screen 40. In other words, the reflection mirror 50 causes the image light 21 emitted from the emission portion 20, to be incident on the screen 40. In the embodiment, the reflection mirror 50 corresponds to an optical portion.

In this embodiment, the reflection surface 51 has a rotationally symmetric shape about the optical axis 1. Specifically, the reflection surface 51 includes a rotation surface obtained by rotating a curve around the optical axis 1. The curve is obtained by cutting out a part of a parabola. The rotation surface is configured in a manner that a concave side of the parabola (a focus side of the parabola) serves as a light reflection side (reflection surface 51) and the axis of the parabola is different from the optical axis 1. Note that, in FIG. 1, a straight line schematically indicates a cross-sectional shape of the reflection surface 51.

As illustrated in FIG. 1, the reflection surface 51 according to the embodiment has a shape in which its vertex is on the optical axis 1. In other words, with regard to the reflection surface 51, an intersection between the rotation surface and the optical axis 1 protrudes when viewed from the emission portion 20. In addition, with reference to a cross-sectional shape of the reflection mirror 50, a left curve and a right curve are disposed with the optical axis 1 interposed therebetween, and each of the curves has a parabola shape that is concave when viewed from the emission portion 20.

As described above, when a paraboloid using a parabola serves as the reflection surface 51, it is possible to control a reflection direction of the image light 21, that is, an incident direction of the screen (tapered screen 34). This allows the reflection mirror 50 to control the incident angle θ of the image light 21 emitted from the emission portion 20 to the screen 40.

The specific configuration and the like of the reflection mirror 50 are not limited. For example, any material including resin such as acrylic resin, glass, metal, or the like may be used as material constituting the reflection mirror 50. For example, the reflection mirror 50 is obtained by performing mirror-like finishing on a surface of such material and obtaining surface roughness Ra that is approximately less than 0.1 μm. Alternatively, for example, any material may be used for the reflection mirror 50 in accordance with processing accuracy, productivity, and the like.

Alternatively, for example, it is also possible to apply a high-reflection coating or the like to the reflection surface 51 of the reflection mirror 50. For the high-reflection coating, a thin aluminum film, a thin silver film, or the like is used. Therefore, it is possible to highly efficiently reflect the image light 21 incident on the reflection surface 51. Alternatively, it is also possible to appropriately apply a protective coating or the like to the surface of the reflection surface 51. The protective coating is for protecting the reflection surface 51 by using a thin film such as an SiO2 film, a polymerized film, or the like. In addition, material and the like of the high-reflection coating and the protective coating are not limited.

As illustrated in FIG. 1, the image light 21 radially emitted upward from the emission portion 20 is reflected by the reflection surface 51 of the reflection mirror 50 in a manner that the image light 21 radially goes toward the whole circumference of the screen 40. As described above, the reflection surface 51 includes the rotation surface having the parabola shape. Therefore, the image light 21 reflected by the rotation surface is incident on the screen 40 at the substantially fixed incident angles θ. Specifically, the reflection mirror 50 controls the incident angles θ of the image light 21 incident on the screen 40 in a manner that the incident angles θ are substantially fixed. As a result, the image light 21 reflected by the reflection mirror 50 is emitted toward the screen 40 as substantially parallel light beams.

For example, the reflection mirror 50 is configured in a manner that the image light 21 is incident on the screen 40 at the incident angle $θ_0$. This makes it possible to diffract the image light 21 incident on the screen 40 with high diffraction efficiency and emit the diffused light 24. As a result, it is possible to improve brightness (intensity) of the diffused light 24 and display an image having high luminance, for example.

Note that, in the present disclosure, the substantially fixed incident angles θ include an incident angle θ that falls within an angle range (allowable angle range) capable of appropriately displaying an image. The allowable angle range is appropriately set in accordance with diffraction characteristics of the transmissive hologram 43 (screen 40). For example, the diffraction angle range 44 or the like described above with reference to FIG. 2 is set as the allowable angle range.

The allowable angle range is set to an angle range in which the diffraction efficiencies of all the color light beams of R, G, and B on the hologram screen are a predetermined value or more (such as 40%, 50%, or 60%), for example. Alternatively, it is also possible to set the allowable angle range on the basis of the diffraction efficiency of 20%, 30%, or the like. Alternatively, for example, on the basis of an intermediate value of the angle range, it is possible to set an angle range of the intermediate value±5% or an angle range of the intermediate value±10% as the allowable angle range. In addition, the method and the like of setting the allowable angle range are not limited.

Figure 3A:
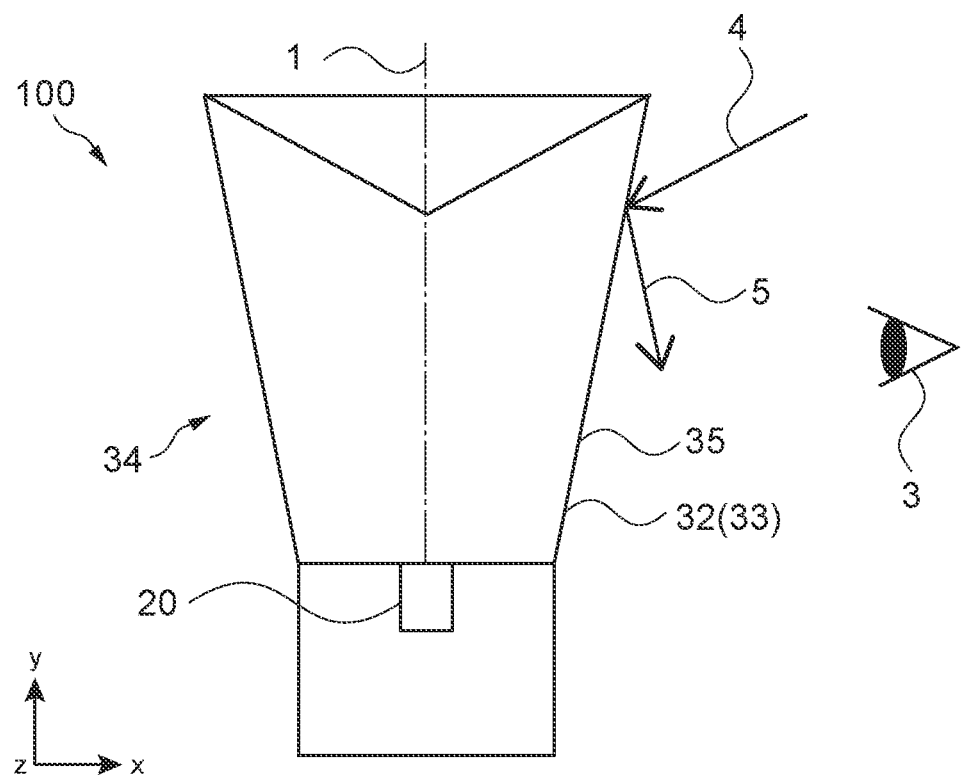
FIG. 3 is a FIGS. 3A and 3B are schematic diagrams for describing optical paths of outside light incident on a tapered screen.
Figure 3B:
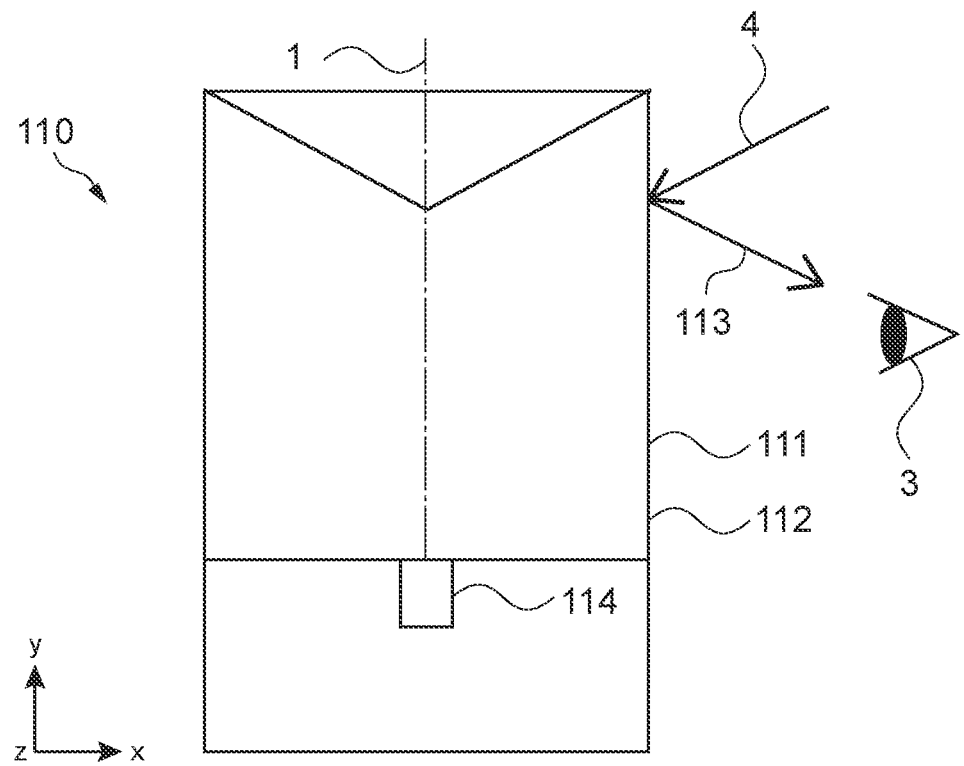

FIG. 3 is a schematic diagram for describing optical paths of outside light incident on the tapered screen 34. FIG. 3A schematically illustrates a cross section of the image display device 100 (tapered screen 34) taken along a plane including the optical axis 1. In addition, FIG. 3B schematically illustrates a cross section of an image display device 110 according to a comparative example. The image display device 110 is a cylindrical display device including a cylindrical screen 111. Note that, FIG. 3 does not illustrate structural elements in a thickness direction of the cylindrical screen 111 and the tapered screen 34.

FIG. 3A and FIG. 3B illustrate states where a user 3 views the image display devices 100 and 110 from the horizontal direction (X direction). In addition, it is assumed that outside light 4 is incident of the image display devices 100 and 110 at similar angles.

The outside light 4 is light incident from an outside of the device. For example, in a case of an indoor space, it is considered that the outside light 4 (outside illumination light) such as light from a fluorescent lamp on a ceiling, an LED light, or a spot light is incident from an obliquely upward direction (upper right direction in FIG. 3A and FIG. 3B). Alternatively, in a case of an outdoor space, there is a possibility that the outside light 4 such as sunlight or light from a street light is incident from the obliquely upward direction.

As illustrated in FIG. 3B, it is assumed that the outside light 4 is incident on an outer surface 112 of the cylindrical screen 111 at a certain angle. The outer surface 112 of the cylindrical screen 111 is a cylindrical surface that extends in the up-down direction (Y direction), for example. In addition, sometimes the outside light 4 incident on the outer surface 112 is reflected by the outer surface 112. For example, reflected light 113 of the outside light 4 incident on the cylindrical screen 111 at the angle illustrated in FIG. 3B propagates toward a viewpoint of the user 3.

In this case, the reflected light 113 reaches the viewpoint of the user 3, and the user 3 views light reflected by the cylindrical screen 111. As a result, there is a possibility that an amount of light reflected by the cylindrical screen 111 increases and transparency decreases. In addition, sometimes it is difficult to properly view an image displayed on the cylindrical screen 111.

In FIG. 3A, the outside light is incident on the outer surface 35 of the tapered screen 34 at an angle similar to the FIG. 3B. For example, in the case of the configuration of the tapered screen 34 described with reference to FIG. 1, the second surface 32 serving as the outer periphery of the transparent base material 30 serves as the outer surface 35 of the tapered screen 34. As described above, the second surface 32 of the transparent base material 30 is the tapered surface 33 having the first tapered shape in a manner that the tapered surface 33 expands upward. Therefore, the outer surface 35 of the tapered screen 34 serves as a surface that is inclined downward.

As a result, the outside light 4 incident on the outer surface 35 of the tapered screen 34 is reflected toward a lower side than the reflected by the cylindrical screen 111, for example. As a result, the reflected light 5 of the outside light 4 reflected by the tapered screen 34 propagates toward a ground contact surface (such as floor or table) in front of the user 3, and does not reach the viewpoint of the user 3.

As described above, when the tapered screen 34 has the outer surface 35 of the downward tapered shape (first tapered shape) with respect to beams of the outside light 4 enter the device at a same angle, it is possible to direct the reflected light 5 that is reflected by the outer surface 35 downward. This makes it possible to reduce an amount of reflected light viewed by the user 3, and improve transparency of the tapered screen 34. In addition, by reducing the amount of reflected light, it is possible to properly view an image displayed on the tapered screen 34. As a result, it is possible to display a high-quality image.

Figure 4A:
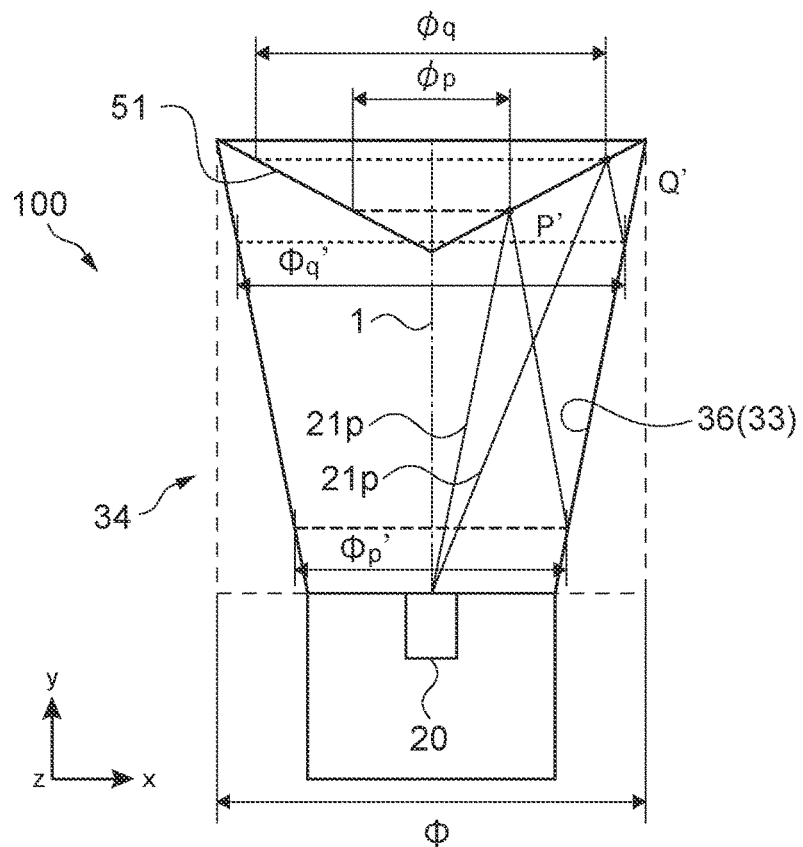
FIGS. 4A and 4B are schematic diagrams for describing optical paths of image light incident on the tapered screen.
Figure 4B:
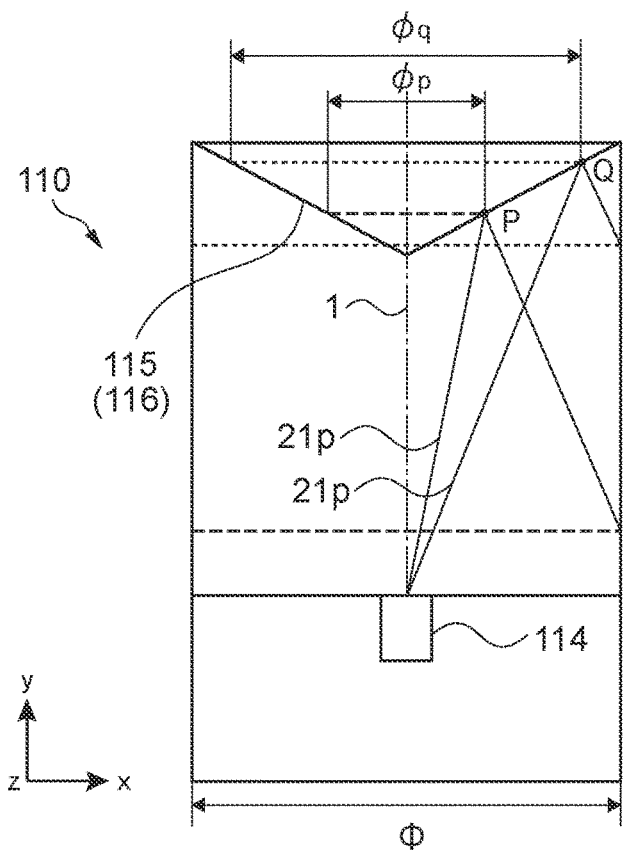

FIG. 4 is a schematic diagram for describing optical paths of the image light 21 incident on the tapered screen 34. FIG. 4A schematically illustrates a cross section of the image display device 100 (tapered screen 34) taken along a plane including the optical axis 1. In addition, FIG. 4B schematically illustrates a cross section of the image display device 110 including a cylindrical screen 111 according to the comparative example. Note that, FIG. 4 does not illustrate structural elements in a thickness direction of the cylindrical screen 111 and the tapered screen 34.

Emission portion 114 and the reflection mirror 115 illustrated in FIG. 4B are configured in a way similar to the emission portion 20 and the reflection mirror 60 illustrated in FIG. 4A. In addition, it is assumed that the height of the image display device 110 is similar to the height of the image display device 100, and a distance between the emission portion 114 and the reflection mirror 115 is similar to a distance between the emission portion 20 and the reflection mirror 50.

FIG. 4B schematically illustrates image light $21p$ and image light $21q$. The image light $21p$ is projected at a reflection position P that is close to the optical axis 1 of the reflection mirror 115 (reflection surface 116). The image light $21q$ is projected at a reflection position Q that is farther from the optical axis 1 than the reflection position P. The image light $21p$ and the image light $21q$ are respectively reflected at the reflection positions P and Q, and are emitted toward the cylindrical screen 111 at respective angles depending on characteristics of the reflection positions. FIG. 4B schematically illustrate the image light $21p$ and the image light $21q$ reached the cylindrical screen 111.

In the case where the image light 21 is incident on the cylindrical screen 111 by using a rotationally symmetric reflection surface 116 (solid-of-revolution mirror), the image light 21 is horizontally magnified at magnification depending on a reflection position on the reflection surface 116, and enters the cylindrical screen 111. The horizontal magnification M is represented as follows by using a diameter Φ of the cylindrical screen 111 and a diameter φ of the reflection surface 116 obtained at a reflection position, for example.

$M=\Phi/\varphi$

For example, as illustrated in FIG. 4B, the image light 21 incident on the reflection position P that is close to the optical axis 1 is reflected at the reflection position P and horizontally magnified at magnification $M_p=\Phi/\varphi_p$ before reaching the cylindrical screen 111. In a similar way, the image light 21 incident on the reflection position Q that is farther from the optical axis 1 is reflected at the reflection position Q and horizontally magnified at magnification $M_q=\Phi/\varphi_q$ before reaching the cylindrical screen 111.

As a result, the horizontal magnification $M_p$ at the reflection position P that is close to the optical axis 1 is larger than the horizontal magnification $M_q$ at the reflection position Q that is farther from the optical axis 1 ($M_p>M_q$). Therefore, it can be said that the magnification of the image light 21 that reaches the cylindrical screen 111 increases as its reflection position gets closer to the center (optical axis 1) of the reflection surface 116. In addition, in FIG. 4B, the image light 21 is incident on a lower side of the cylindrical screen 111 as its reflection position gets closer to the optical axis 1. Therefore, the horizontal magnification increases as the reflection position gets closer to the bottom of the cylindrical screen 111.

Accordingly, for example, there is a possibility that luminance of an image displayed on the cylindrical screen 111 by using the image light 21 reflected at the reflection position P that is close to the optical axis 1 is lower than luminance of an image displayed on the cylindrical screen 111 by using the image light 21 reflected at the reflection position Q that is farther from the optical axis 1. In other words, there is a possibility that luminance of the displayed image decreases as the incident position gets closer to the bottom of the cylindrical screen 111, and this results in uneven luminance in the up-down direction.

In addition, the total number of pixels of the image light 21 projected near the center of the reflection surface 116 is smaller than the image light 21 projected near the outer periphery of the reflection surface 116, and the horizontal magnitude M of the image light 21 projected near the center of the reflection surface 116 is larger than the image light 21 projected near the outer periphery of the reflection surface 116. Therefore, an image with low resolution is displayed on the cylindrical screen 111. Therefore, for example, sometimes a rough image is obtained near the bottom of the cylindrical screen 111.

In FIG. 4A, the image light 21 is incident on the inner surface 36 of the tapered screen 34 at an angle similar to the FIG. 4B. In addition, in FIG. 4A, it is assumed that a reflection position P' that is close to the optical axis 1 and a reflection position Q' that is farther from the optical axis 1 are positions on the reflection surface 51 that are similar to the reflection position P and the reflection position Q illustrated in FIG. 4B.

For example, in the case of the configuration illustrated in FIG. 1, the third surface 41 that is the inner periphery of the screen 40 (transmissive hologram 43) serves as the inner surface 36 of the tapered screen 34. As described above, the second surface 32 of the transparent base material 30 is the tapered surface 33 having the first tapered shape in a manner that the tapered surface 33 expands upward. Therefore, the inner surface 36 of the tapered screen 34 has a smaller diameter as it gets closer to the bottom.

A diameter $\Phi_p'$ of the screen 40 obtained at an incident position of the image light 21 reflected at the reflection position P' that is close to the optical axis 1 is smaller than a diameter Φ of the cylindrical screen 111 illustrated in FIG. 4A. As a result, the horizontal magnification $M_p'$ at the reflection position P' that is close to the optical axis 1 of the tapered screen 34 is smaller than the horizontal magnification $M_p$ at the reflection position P on the cylindrical screen 111.

in addition, the horizontal magnification $M_q'$ at the reflection position Q' that is close to the optical axis 1 of the tapered screen 34 is smaller than the horizontal magnification $M_q$ at the reflection position Q on the cylindrical screen 111. Note that, the incident position of the image light 21 reflected at the reflection position Q' on the tapered screen 34 is an upper side of the tapered screen 34. Therefore, an amount of reduction in the magnification $M_q'$ is smaller than an amount of reduction in the magnification $M_p'$ at a lower side of the tapered screen 34.

As a result, a difference in magnification in the up-down direction of the tapered screen 34 (such as $M_p'-M_q'$) is smaller than a difference in magnification in the up-down direction of the cylindrical screen 111 (such as $M_p-M_q$). In other words, by using the tapered screen 34, it is possible to reduce the difference in magnification in the horizontal direction of the image light 21 incident on an upper side and a lower side of the tapered screen 34.

As described above, the screen 40 for displaying an image is formed on the tapered surface 33 having the first tapered shape. This makes it possible to reduce a diameter at a display position of the image light 21 in comparison with the case of using the cylindrical screen 111 that is not tapered. The magnification in the horizontal direction gets smaller as the diameter of the display position decreases. This makes it possible to reduce the difference in magnification between an upper position and a lower position. This results in suppression of uneven luminance in the up-down direction. In addition, by reducing the difference in magnification, it is possible to improve resolution of an image displayed at a lower side of the tapered screen 34.

Next, a configuration example of an internal tapered screen 34 will be described. The screen 40 is provided on the inner surface 36 of the internal tapered screen 34. In other words, the internal tapered screen 34 is configured in a manner that the screen 40 (transmissive hologram 43) is provided on the first surface 31 serving as the inner periphery of the transparent base material 30.

FIG. 5 to FIG. 8 are schematic diagrams illustrating configuration examples of the internal tapered screen 34. FIG. 5A to FIG. 8A schematically illustrate cross-sections taken along a plane including the optical axis 1 of the image display device 100 including tapered screens 34a to 34d. In addition, FIG. 5B to FIG. 8B are schematic diagrams illustrating examples of an optical path of the image light 21 incident on the respective tapered screens 34a to 34d.

Figure 5A:
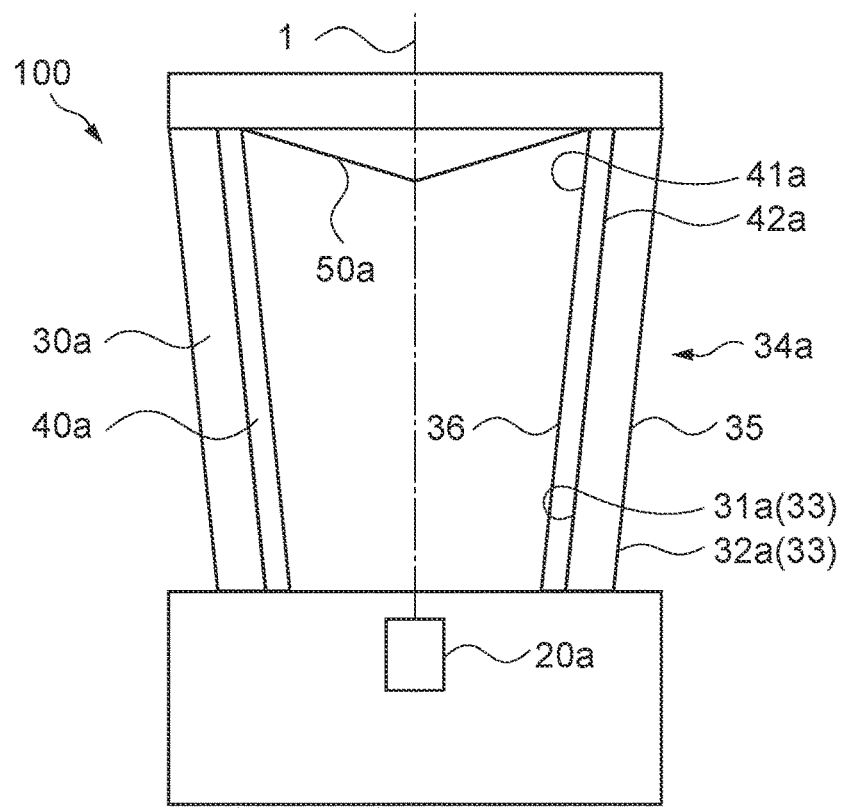
FIGS. 5A and 5B are is schematic diagrams illustrating a configuration example of an internal tapered screen.

The tapered screen 34a illustrated in FIG. 5A is configured in a way similar to the tapered screen 34 described above with reference to FIG. 1 and the like. In other words, the tapered surface 33 having the first tapered shape is formed on both an internal first surface 31a and an external second surface 32a of the transparent base material 30a. A taper angle σ of the first surface 31a and a taper angle σ of the second surface 32a are set to a same value. Hereinafter, the taper angle of the first surface 31a will be referred to as an interior taper angle σ1, and the taper angle of the second surface 32a will be referred to as an exterior taper angle σ2.

Figure 5B:
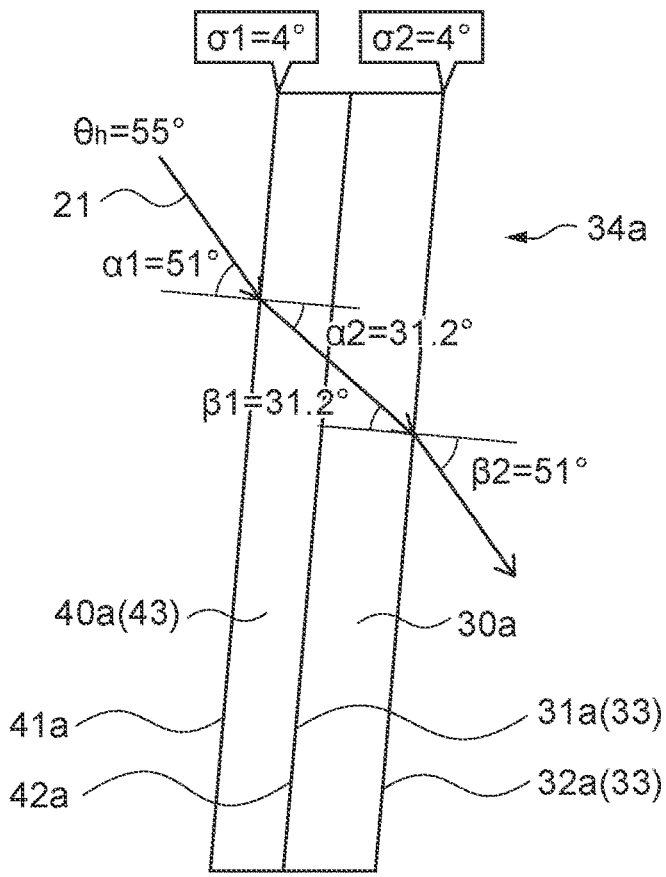

FIG. 5B schematically illustrates an example of an optical path of the image light 21 incident on the tapered screen 34a at a horizontal incident angle $\theta_h=55°$. The image light 21 is emitted from the inside of the tapered screen 34a, passes through the screen 40a and the transparent base material 30a, and goes to the outside of the tapered screen 34a.

The optical path illustrated in FIG. 5B is an optical path obtained when the light is not diffracted by the screen 40a (transmissive hologram 43) or the like. In another respect, it can be said that the optical path illustrated in FIG. 5B is an optical path defined by positions and materials of the screen 40a and the transparent base material 30a in a state where the interference pattern or the like is not recorded on the screen 40a.

As described with reference to FIG. 2 and the like, the screen 40a is configured in a manner that the image light 21 (incident light 23) incident on the screen 40a at a predetermined incident angle v is diffracted with certain diffraction efficiency. In this case, among beams of the image light 21 incident of the screen 40a, some of the beams of the image light 21 pass through the screen 40a and the transparent base material 30a without being diffracted by the screen 40a. As described above, the light that is not diffracted by the screen 40a passes through the screen 40a along the optical path illustrated in FIG. 5B, for example.

The image light 21 reflected by the reflection mirror 50a is incident on the third surface 41a serving as the inner periphery of the screen 40a. At this time, the image light 21 is refracted by the third surface 41a and enters the inside of the screen 40a in accordance with a difference between a refractive index of air and a refractive index of the screen 40a (transmissive hologram 43). Hereinafter, an incident angle θ of the image light 21 incident on the third surface 41a (inner surface 36 of tapered screen 34a) will be referred to as a1. In addition, a refraction angle of the image light 21 refracted by the third surface 41a will be referred to as α2. Note that, α1 and α2 are an angle between the optical path of the image light 21 and a normal direction of the third surface 41a.

The image light 21 incident on the screen 40a passes through a connection surface that connects the screen 40a to the transparent base material 30a (the fourth surface 42a of the screen 40a and the first surface 31a of the transparent base material 30a). For example, in the case where a refractive index of the screen 40a is close to a refractive index of the transparent base material 30a, the image light 21 is hardly refracted and passes through the connection surface as illustrated in FIG. 5B.

The image light 21 passed through the connection surface is emitted from the outer periphery (second surface 32a) of the transparent base material 30a, that is, the outer surface 35 of the tapered screen 34a. At this time, the image light 21 is refracted by the second surface 32a and is emitted to the outside of the transparent base material 30a in accordance with a difference between a refractive index of air and a refractive index of the transparent base material 30a. Hereinafter, an incident angle θ on the second surface 32a (outer surface 35 of tapered screen 34a) will be referred to as (31. In addition, an output angle of the image light 21 refracted by and is emitted from the second surface 32a will be referred to as (32. Note that, (31 and (32 are an angle between the optical path of the image light 21 and a normal direction of the second surface 32a.

In the case where the image light 21 passed through the tapered screen 34a goes to the outside, the image light 21 propagates from a medium with high refractive index (transparent base material 30a) toward a medium with low refractive index (air). In such a case, sometimes total reflection happens at the interface when an incident angle on the interface (second surface 32a) is larger than a predetermined angle (critical angle). For example, when the incident angle (31 on the outer surface 35 (second surface 32a) of the tapered screen 34a) gets larger, the total reflection happens at the outer surface 35, and this prohibits the image light 21 from propagating from the inside of the transparent base material 30 toward the air.

In the embodiment, configuration parameters for configuring the tapered screen (interior taper angle σ1, exterior taper angle σ2, horizontal incident angle $θ_h$, refractive index of transmissive hologram 43 (HOE refractive index), refractive index of transparent base material 30 (base material refractive index), thickness of transparent base material 30, and the like) are appropriately set in a manner that conditions for the total reflection are not satisfied. Here, the conditions for the total reflection are conditions for respective parameters to cause the total reflection.

By using such configuration parameters, it is possible to avoid the total reflection at the outer surface 35, and it is possible to properly display an image on the tapered screen 34a. Note that, in other configuration examples to be described later, configuration parameters for configuring the tapered screen 34 are set in a manner that the total reflection conditions are not satisfied. As described above, in the present disclosure, the shape, material, and the like of the tapered screen 34 are set to avoid the total reflection of the incident image light 21.

TABLE 1

Horizontal incident angle: 55°, HOE refractive index: 1.5, Base material refractive index: 1.5

| Interior taper angle σ1 | 0.0 | 4.0 | 8.0 | 12.0 | 16.0 | 20.0 |
|---|---|---|---|---|---|---|
| Exterior taper angle σ2 | 0.0 | 4.0 | 8.0 | 12.0 | 16.0 | 20.0 |
| Incident angle α1 | 55.0 | 51.0 | 47.0 | 43.0 | 39.0 | 35.0 |
| Refraction angle α2 | 33.1 | 31.2 | 29.2 | 27.0 | 24.8 | 22.5 |
| Incident angle β1 | 33.1 | 31.2 | 29.2 | 27.0 | 24.8 | 22.5 |
| Output angle β2 | 55.0 | 51.0 | 47.0 | 43.0 | 39.0 | 35.0 |

The table 1 is a table showing examples of calculation results of the incident angle α1, the refraction angle α2, the incident angle β1, and the output angle β2 in the case where the interior taper angle σ1 and the exterior taper angle σ2 of the tapered screen 34a are used as the parameters. The table 1 show angles σ1, σ2, α1, α2, β1, and β2.

Note that, the horizontal incident angle $θ_h$ of the image light 21 with respect to the horizontal direction is set to 55°. In addition, the refractive index of the screen 40 (HOE refractive index) and the refractive index of the transparent base material 30 (base material refractive index) are set to 1.5. In addition, the tapered screen 34a illustrated in FIG. 5B is set to (σ1, σ2)=(4°, 4°).

In the table 1, both the interior taper angle σ1 and the exterior taper angle σ2 are set to 0°, 4°, 8°, 12°, 16°, and 20°. Note that, in the situation where both the interior taper angle σ1 and the exterior taper angle σ2 are set to 0°, the tapered surfaces 33 are not formed on the transparent base material 30a and the screen has the cylindrical shape.

When the interior taper angle σ1 and the exterior taper angle σ2 are set to a same value, the transparent base material 30a (tapered screen 34a) has an even thickness. Therefore, in the table 1, the incident angle α1 on the tapered screen 34a and the output angle β2 obtained when light is output from the tapered screen 34a have a same value. In addition, the refraction angle α2 at the screen 40a (third surface 41a) and the incident angle α2 on the outer periphery of the transparent base material 30a (second surface 32a) are a same value.

In addition, slope of the tapered shape increases in the case where the interior tapered angle σ1 and the exterior tapered angle σ2 increase. This results in reduction in the refraction angle α2 and the incident angle α1 with respect to the normal direction of the third surface 41a. This results in reduction in the output angle β2 and the incident angle β1 with respect to the normal direction of the second surface 32a.

For example, in the case where σ1 and σ2 are increased from 4° to 20°, the incident angle β1 (refractive index α2) reduces from 31.2° to 22.5°, and the output angle β2 (incident angle α1) reduces from 51° to 35°. As described above, when the tapered shape of the tapered screen 34a has a larger slope, the image light 21 propagates at an angle close to the normal direction of the inner surface 36 and the outer surface 35. This makes it possible to easily prevent the above-described total reflection conditions from being satisfied.

Accordingly, it can be said that the tapered screen 34a is configured in a manner that it is easy to increase the slope of the tapered shape. This makes it possible to easily configure the outer surface 35 that easily reflects the outside light 4, and the inner surface 36 capable of reducing a difference in the magnification in the horizontal direction.

As described above, the tapered screen 34a includes the second surface 32a having the first tapered shape. This makes it possible to direct the reflection direction of the outside light 4 downward. As a result, it is possible to suppress an amount of reflection at the outer surface 35 and improve transparency. In addition, since the first surface 31a has the first tapered shape, it is possible to reduce a difference in horizontal magnification of the image light 21 incident on the screen 40a. This results in improvement in uneven luminance in the up-down direction of the tapered screen 34a, and the like.

In addition, as illustrated in FIG. 5A, the taper angle σ1 of the first surface 31a and the taper angle σ2 of the second surface 31a are equal in the transparent base material 30. Therefore, the transparent base material 30 is a member having an even thickness. Accordingly, the thickness of the transparent base material 30a becomes less prominent, and it is possible to achieve excellent transparency. As a result, it is possible to display a high-quality image and the like as if the image were floating in the air.

In addition, as shown in the table 1, the incident angle β1 is not increased even when the interior taper angle σ1 and the exterior taper angle σ2 gets larger with regard to the configuration of the tapered screen 34a. This makes it possible to easily avoid the total reflection. Therefore, for example, it is possible to form the tapered surface 33 having the downward tapered shape with a large slope on the inner side and the outer side, and it is possible to sufficiently avoid uneven luminance, malfunction, and the like caused by reflection of the outside light 4.

Figure 6A:
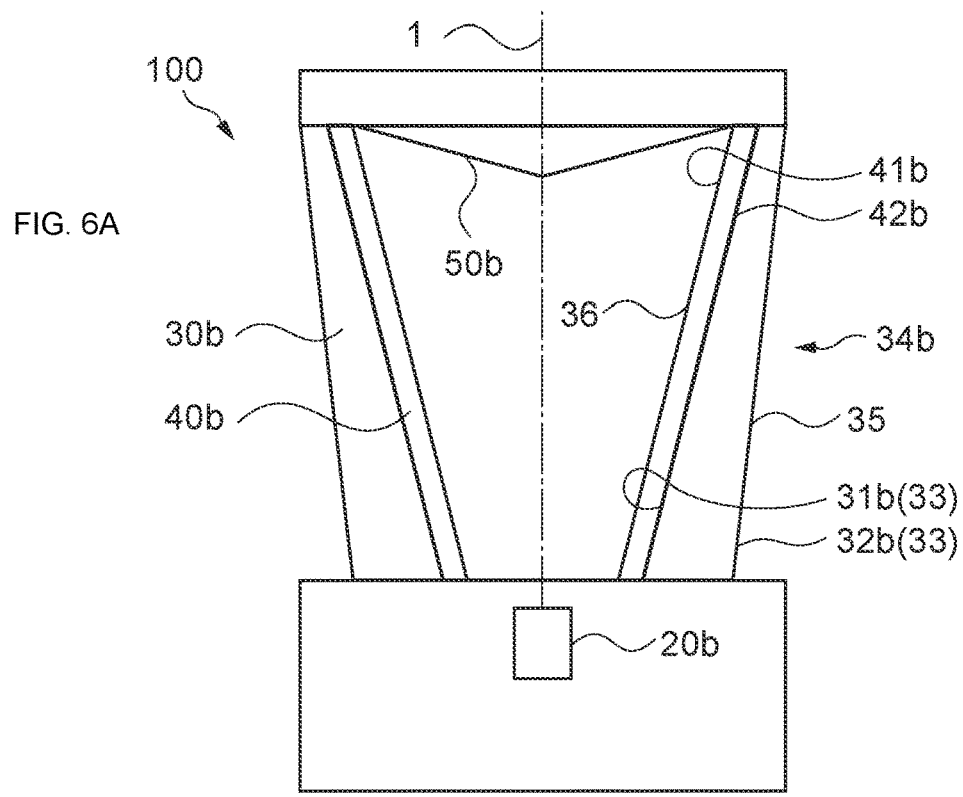
FIG. 6 is FIGS. 6A and 6B area schematic diagrams illustrating a configuration example of an internal tapered screen.

As illustrated in FIG. 6A, a transparent base material 30b of a tapered screen 34b is configured in a manner that both the first surface 31b and the second surface 31b are tapered surfaces 33 having the first tapered shape. In addition, a taper angle σ1 of the first surface 31b is set to an angle different from a taper angle σ2 of the second surface 32b. A screen 40b is provided on an inner tapered surface (first surface 31b) of the transparent base material 30b.

Figure 6B:
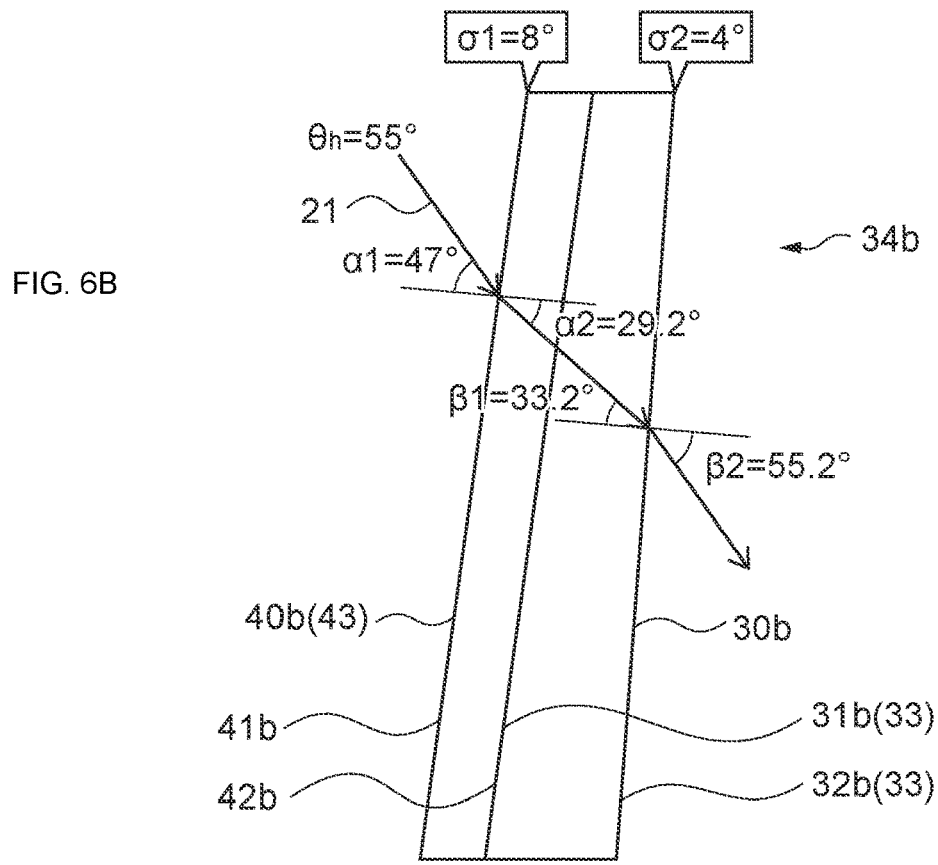

FIG. 6B schematically illustrates an example of an optical path of the image light 21 incident on the tapered screen 34b at a horizontal incident angle $θ_h$=55°. The image light 21 is emitted from the inside of the tapered screen 34b, passes through the screen 40b and the transparent base material 30b, and goes to the outside of the tapered screen 34b. Note that, the optical path illustrated in FIG. 6B is an optical path obtained when the light is not diffracted by the screen 40b (transmissive hologram 43) or the like.

TABLE 2

Horizontal incident angle: 55°, HOE refractive index: 1.5, Base material refractive index: 1.5

| Interior taper angle σ1 | 0.0 | 4.0 | 8.0 | 12.0 | 16.0 | 20.0 |
|---|---|---|---|---|---|---|
| Exterior taper angle σ2 | 0.0 | 2.0 | 4.0 | 6.0 | 8.0 | 10.0 |
| Incident angle α1 | 55.0 | 51.0 | 47.0 | 43.0 | 39.0 | 35.0 |
| Refraction angle α2 | 33.1 | 31.2 | 29.2 | 27.0 | 24.8 | 22.5 |
| Incident angle β1 | 33.1 | 33.2 | 33.2 | 33.0 | 32.8 | 32.5 |
| Output angle β2 | 55.0 | 55.2 | 55.2 | 54.9 | 54.4 | 53.7 |

The table 2 is a table showing examples of calculation results of the incident angle α1, the refraction angle α2, the incident angle β1, and the output angle β2 in the case where the interior taper angle σ1 and the exterior taper angle σ2 of the tapered screen 34b are used as the parameters. Note that, the horizontal incident angle $\theta_h$ is 55°, and the HOE refractive index and the base material refractive index are 1.5.

In the table 2, the interior taper angle σ1 and the exterior taper angle σ2 are set to (4°, 2°), (8°, 4°), (12°, 6°), (16°, 8°), and (20°, 10°). Note that, in the case of (0°, 0°), the tapered surfaces 33 are not formed on the transparent base material 30a and the screen has the cylindrical shape. In addition, the tapered screen 34b illustrated in FIG. 6B is set to (σ1, σ2)=(8°, 4°).

In the example shown in the table 2, the interior taper angle σ1 is set to a value larger than the exterior taper angle σ2 (doubled in table 2). In this case, the screen 40b having the inverse tapered shape (first tapered shape) is formed on the inside of the tapered screen 34b in a manner that the inside of the tapered screen 34b is steeper than the outside of the tapered screen 34b.

In addition, because the value of σ1 is different from the value of σ2, the inner surface 36b of the tapered screen 34b is not parallel to the outer surface 35 of the tapered screen 34b, for example. Therefore, for example, light incident on the screen 40b at the incident angle α1 is output from the transparent base material 60b at the output angle β2, which is different from the incident angle α1.

Note that, as shown in the table 2, the incident angle β1 on the second surface 32b that is on the outside of the transparent base material 30b decreases as σ1 and σ2 increase in the case where σ1 is set to a value obtained by doubling σ2. For example, in the case where σ1 and σ2 increase from (4°, 2°) to (20°, 10°), the incident angle β1 decreases from 33.2° to 32.5°. In the case where the interior taper angle σ1 and the exterior taper angle σ2 are set as described above, the incident angle β1 is not increased. This makes it possible to easily avoid the total reflection.

Since the first surface 31b has the first tapered shape, it is possible to reduce a difference in horizontal magnification of the image light 21 incident on the screen 40b of the tapered screen 34b. This results in improvement in uneven luminance in the up-down direction of the tapered screen 34b, and the like. In addition, for example, the second surface 32b has the first tapered shape. Therefore, it is possible to suppress an amount of reflection at the outer surface 35 and improve transparency.

In addition, a taper angle σ1 of the first surface 31b is set to an angle different from a taper angle σ2 of the second surface 32b. As a result, the transparent base material 30b with slanted thickness (uneven thickness) is obtained. For example, according to the configuration example illustrated in FIG. 6B, the bottom thickness of the transparent base material 30b is larger, and the top thickness of the transparent base material 30b is smaller. Note that, the bottom thickness may be thinner and the top thickness may be thicker depending on the settings of the respective taper angles σ1 and σ2.

As described above, by setting the taper angles σ1 and σ2 to different values, it is possible to independently control suppression of the uneven luminance, an amount of reflected light of the outside light 4, and the like as described above, for example. In addition, for example, it is possible to tilt the inner tapered surface 33 without changing appearance, shape, and the like of the tapered screen 34b.

This makes it possible to greatly tilt the first tapered surface 33b even in the case where the device size (such as diameter) of the image display device 100 is limited, for example. In other words, it is possible to achieve a larger interior taper angle σ1 that it looks from the outside even in the case where its external diameter is limited. As a result, it is possible to sufficiently reduce a difference in magnification in the up-down direction of the tapered screen 34b. This makes it possible to obtain the whole circumference screen or the like with suppressed uneven luminance in the up-down direction while accepting the restriction and the like on its size.

In addition, the transparent base material 30b has the slanted thickness. This makes it possible to improve strength of a main body of the transparent base material 30b, for example. As a result, it is possible to avoid deformation of the transparent base material 30b at a time of injection molding, and easily manufacture the transparent base material 30b, for example. This makes it possible to suppress a yield and manufacturing cost.

Figure 7A:
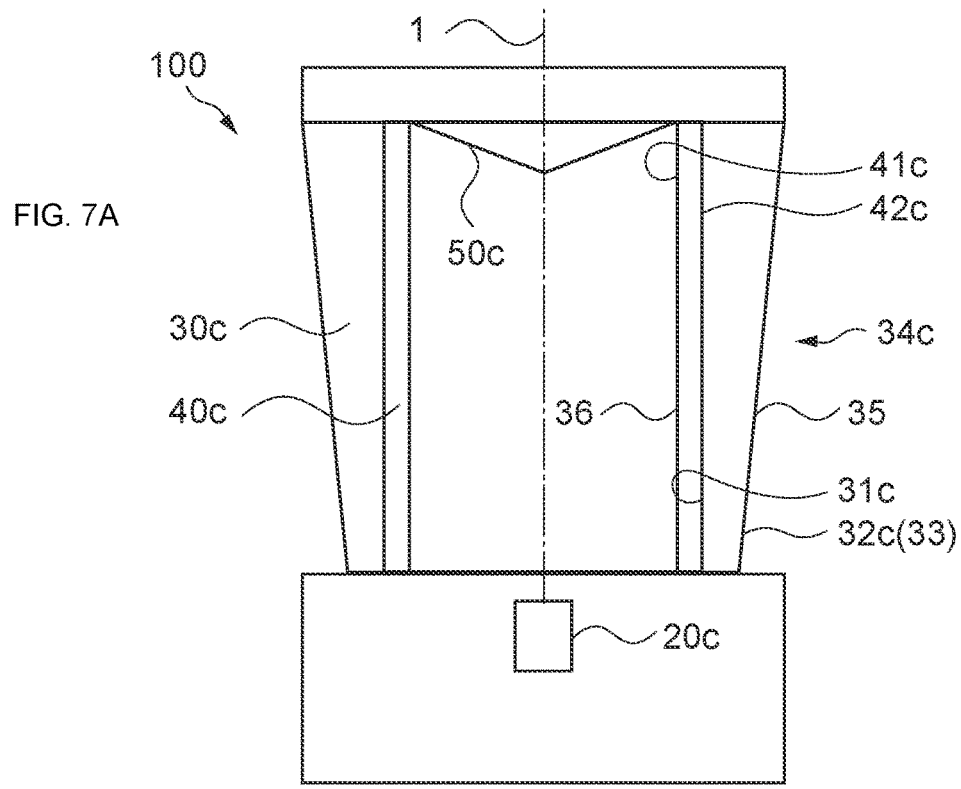
FIGS. 7A and 7B is are schematic diagrams illustrating a configuration example of an internal tapered screen.

As illustrated in FIG. 7A, a tapered screen 34c is configured in a manner that the second surface 32c is the tapered surface 33 having the first tapered shape among the inner periphery (first surface 31c) and the outer periphery (second surface 32c) of a transparent base material 30c. In addition, the first surface 31c is configured as a cylindrical surface. A screen 40c is provided on an inner cylindrical surface (first surface 31c) of the transparent base material 30c. In other words, the inner surface 36 of the tapered screen 34c has the cylindrical shape, and the outer surface 35 of the tapered screen 34c has an inverse tapered tubular shape.

Figure 7B:
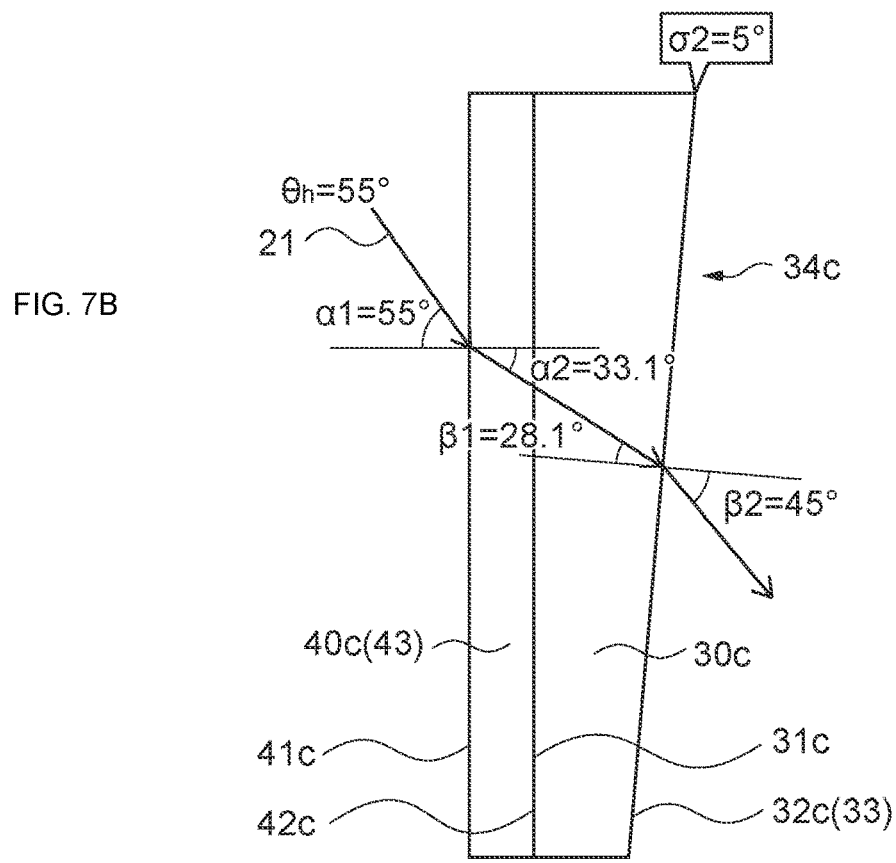

FIG. 7B schematically illustrates an example of an optical path of the image light 21 incident on the tapered screen 34c at a horizontal incident angle $\theta_h$=55°. The image light 21 is emitted from the inside of the tapered screen 34c, passes through the screen 40c and the transparent base material 30c, and goes to the outside of the tapered screen 34c. Note that, the optical path illustrated in FIG. 7B is an optical path obtained when the light is not diffracted by the screen 40c (transmissive hologram 43) or the like.

TABLE 3

Horizontal incident angle: 55°, HOE refractive
index: 1.5, Base material refractive index: 1.5

| Interior taper angle σ1 | 0.0 | 0.0 | 0.0 | 0.0 | 0.0 | 0.0 | 0.0 | 0.0 | 0.0 |
|---|---|---|---|---|---|---|---|---|---|
| Exterior taper angle σ2 | 0.0 | 1.0 | 2.0 | 3.0 | 4.0 | 5.0 | 6.0 | 7.0 | 8.0 |
| Incident angle α1 | 55.0 | 55.0 | 55.0 | 55.0 | 55.0 | 55.0 | 55.0 | 55.0 | 55.0 |
| Refraction angle α2 | 33.1 | 33.1 | 33.1 | 33.1 | 33.1 | 33.1 | 33.1 | 33.1 | 33.1 |
| Incident angle β1 | 33.1 | 32.1 | 31.1 | 30.1 | 29.1 | 28.1 | 27.1 | 26.1 | 25.1 |
| Output angle β2 | 55.0 | 52.9 | 50.8 | 48.8 | 46.8 | 45.0 | 43.1 | 41.3 | 39.5 |

The table 3 is a table showing examples of calculation results of the incident angle α1, the refraction angle α2, the incident angle β1, and the output angle β2 in the case where the interior taper angle σ1 and the exterior taper angle σ2 of the tapered screen 34c are used as the parameters. Note that, the horizontal incident angle $\theta_h$ is 55°, and the HOE refractive index and the base material refractive index are 1.5.

In the table 3, the exterior taper angle σ2 are set to 0°, 1°, 2°, 3°, 4°, 5°, 6°, 7°, and 8°. Note that, the interior taper angle σ1 is set to 0°. In addition, the tapered screen 34c illustrated in FIG. 7B is set to (σ1, σ2)=(0°, 5°).

The interior taper angle σ1 of the tapered screen 34b is constant, which is 0°. Therefore, the incident angle α1 and the refraction angle α2 to the third surface 41c of the screen 40c are constant values. On the other hand, as the exterior taper angle σ2 increases, the incident angle β1 and the output angle β2 to the second surface 32c of the transparent base material 30c decrease. Accordingly, the incident angle α1 to the inner surface 36 of the tapered screen 34c and the output angle β2 to the outer surface 35 of the tapered screen 34c are different values from each other.

For example, in the case where σ2 increases from 1° to 8°, the incident angle β1 decreases from 32.1° to 25.1°. As described above, the incident angle β1 does not increase even in the case where the exterior taper angle σ2 increases. This makes it possible to easily avoid the total reflection.

The second surface 32c has the first tapered shape. Therefore, it is possible to suppress an amount of reflection at the outer surface 35 and improve transparency of the tapered screen 34c. In addition, the first surface 31c inside the transparent base material 30c has the cylindrical shape. Therefore, the screen 40 disposed on the first surface 31c also has the cylindrical shape. This makes it possible to display an image on the display surface that is not tilted.

Figure 8A:
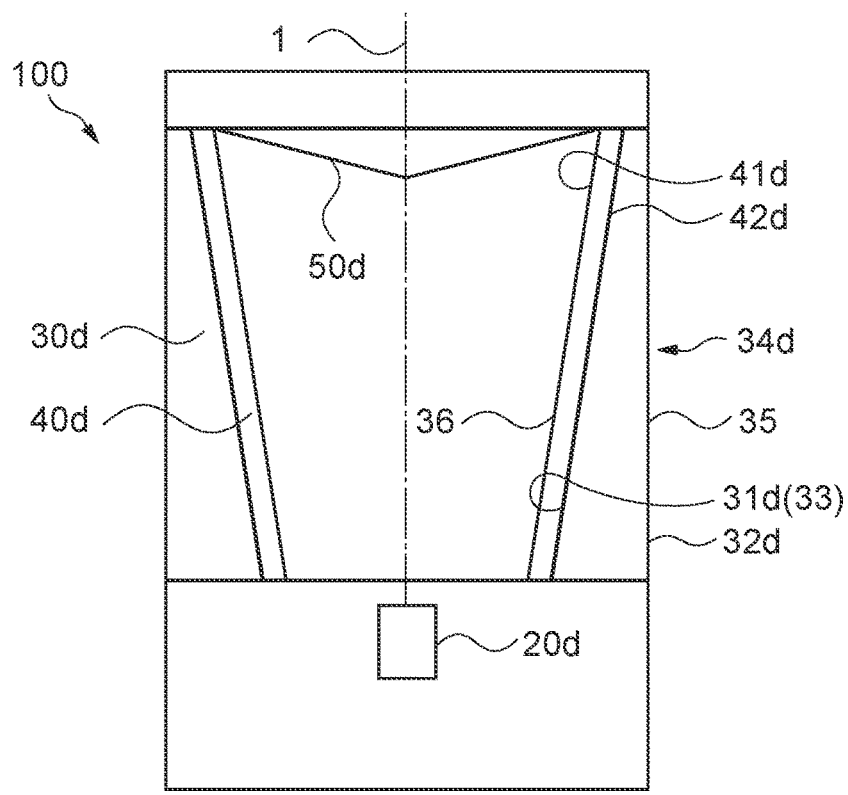
FIG. 8 is a FIGS. 8A and 8B are schematic diagrams illustrating a configuration example of an internal tapered screen.

As illustrated in FIG. 8A, a tapered screen 34d is configured in a manner that the first surface 31d is the tapered surface 33 having the first tapered shape among the inner periphery (first surface 31d) and the outer periphery (second surface 32d) of a transparent base material 30d. In addition, the second surface 32d is configured as a cylindrical surface. A screen 40d is provided on an inner tapered surface 33 (first surface 31d) of the transparent base material 30d. In other words, the outer surface 35 of the tapered screen 34d has the cylindrical shape, and the inner surface 36 of the tapered screen 34d has an inverse tapered tubular shape.

Figure 8B:
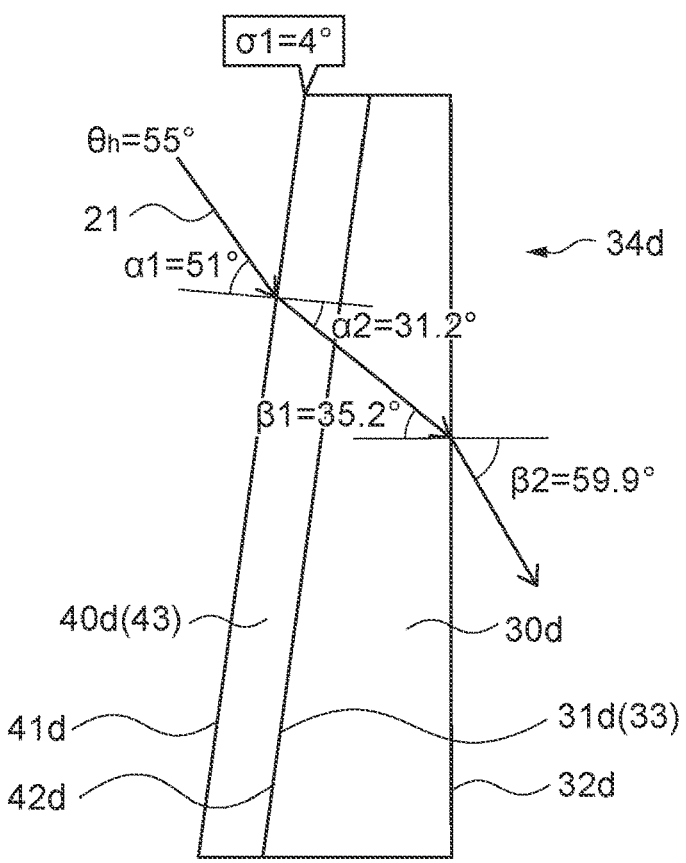

FIG. 8B schematically illustrates an example of an optical path of the image light 21 incident on the tapered screen 34d at a horizontal incident angle $\theta_h$=55°. The image light 21 is emitted from the inside of the tapered screen 34d, passes through the screen 40d and the transparent base material 30d, and goes to the outside of the tapered screen 34d. Note that, the optical path illustrated in FIG. 8B is an optical path obtained when the light is not diffracted by the screen 40d (transmissive hologram 43) or the like.

TABLE 4

Horizontal incident angle: 55°, HOE refractive
index: 1.5, Base material refractive index: 1.5

| Interior taper angle σ1 | 0.0 | 4.0 | 8.0 | 12.0 | 16.0 | 20.0 |
|---|---|---|---|---|---|---|
| Exterior taper angle σ2 | 0.0 | 0.0 | 0.0 | 0.0 | 0.0 | 0.0 |
| Incident angle α1 | 55.0 | 51.0 | 47.0 | 43.0 | 39.0 | 35.0 |
| Refraction angle α2 | 33.1 | 31.2 | 29.2 | 27.0 | 24.8 | 22.5 |
| Incident angle β1 | 33.1 | 35.2 | 37.2 | 39.0 | 40.8 | 42.5 |
| Output angle β2 | 55.0 | 59.9 | 65.0 | 70.9 | 78.6 | |

The table 4 is a table showing examples of calculation results of the incident angle α1, the refraction angle α2, the incident angle β1, and the output angle β2 in the case where the interior taper angle σ1 and the exterior taper angle σ2 of the tapered screen 34d are used as the parameters. Note that, the horizontal incident angle $\theta_h$ is 55°, and the HOE refractive index and the base material refractive index are 1.5.

In the table 4, the interior taper angle σ1 is set to 0°, 4°, 8°, 12°, 16°, and 20°. Note that, the exterior taper angle σ1 is set to 0°. In addition, the tapered screen 34d illustrated in FIG. 8B is set to (σ1, σ2)=(4°, 0°).

As the interior taper angle σ1 of the tapered screen 34d increases, the incident angle α1, the refractive index α2, the incident angle β1, and the output angle β2 vary independently. For example, when the interior tapered angle σ1 increases, an angular difference between the inner surface 36 (third surface 41d) of the tapered screen 24d and the outer surface 35 (second surface 32d) increases. As a result, the incident angle β1 with respect to the second surface 32d increases as σ1 increases.

For example, in the case where σ1 increases from 4° to 20°, the incident angle β1 decreases from 35.2° to 42.5°. Note that, the incident angle β1=42.5° on the second surface 32d is a value that exceeds a critical angle of light that propagates from the transparent base material 30d into air. Therefore, in the case where the interior taper angle σ1 of the tapered screen 34d is set to 20°, the image light 21 incident at the horizontal incident angle $\theta_h$=55° is totally reflected by the second surface 32d.

Therefore, in the case where the horizontal incident angle $\theta_h$ is set to 55°, the interior taper angle σ1 of the tapered screen 34d is appropriately set to a smaller value to avoid the total reflection at the second surface 32d. Alternatively, it is also possible to appropriately adjust the value of the horizontal incident angle $\theta_h$ in a manner that the total reflection conditions are cleared. As described above, in the embodiment, the respective configuration parameters are set in a range capable of avoiding the total refection conditions.

Since the first surface 31d has the first tapered shape, it is possible to reduce a difference in horizontal magnification of the image light 21 incident on the screen 40d of the tapered screen 34d. This results in improvement in uneven luminance in the up-down direction of the tapered screen 34d, and the like. In addition, the external second surface 32d of the transparent base material 30d has the cylindrical shape. This makes it possible to obtain the image display device 100 that has an appearance with no slope.

The above-described configuration parameters for configuring the tapered screens 34a to 34d are mere examples. For example, the respective configuration parameters may be appropriately set in a range capable of cancelling the above-described total reflection conditions in a manner that a whole circumference image or the like is appropriately displayed.

For example, the interior taper angle σ1 is appropriately set to an angle larger than 0°. It is possible to improve the uneven luminance and the like by setting the interior taper angle σ1 when the inner surface 36 of the tapered screen 34 is the tapered surface 33.

For example, the interior taper angle σ1 is set in a range from 1° to 45°. This makes it possible to configure a display surface (screen 40) or the like having a desired shape in a right balance while sufficiently suppressing the uneven luminance and the like.

In addition, for example, the exterior taper angle σ2 is appropriately set to an angle larger than 0°. For example, it is possible to prevent the outside light 4 incident on the tapered screen 34b from being reflected toward the user 3, and it is possible to improve transparency by setting the exterior taper angle σ2 when the outer surface 35 of the tapered screen 34 is the tapered surface 33. For example, the exterior taper angle σ2 is set in a range from 1° to 45°. This makes it possible to configure whole circumference screens having various shapes or the like, while sufficiently suppressing an amount of reflection of the outside light or the like.

For example, the horizontal incident angle $\theta_h$ is appropriately set in a manner that an image is appropriately displayed depending on the use, shape, and the like of the tapered screen 34. Alternatively, the horizontal incident angle $\theta_h$ may be set in accordance with diffraction characteristics of the screen 40 used for the tapered screen 34. In addition, for example, the horizontal incident angle $\theta_h$ may be set depending on the taper angles in the case where the respective taper angles are limited.

In addition, the refractive indices of the screen 40 and the transparent base material 30 are set to a value larger than 1 in a manner that the total reflection conditions are cleared, for example. Note that, the refractive indices of the screen 40 and the transparent base material 30 may be set to similar values, or different values. In addition, the thickness of the transparent base material 30, the thickness of the screen 40, and the like may be appropriately set as the configuration parameters.

FIG. 9 is a schematic diagram illustrating configuration examples of an external tapered screen 34. The screen 40 (transmissive hologram 43) is provided on the outer surface 35 of the external tapered screen 34. In other words, in the external tapered screen 34, the screen 40 is disposed on the second surface 32 of the transparent base material 30.

FIG. 9(a) to FIG. 9(d) schematically illustrate cross-sections taken along a plane including the optical axis 1 of the image display device 100 including external tapered screens 34e to 34h. Note that, for example, the tapered screens 34e to 34h are configured in ways similar to the case where the screen 40 is disposed outside the transparent base material 30 with regard to the above-described tapered screen 34a to 34d.

As illustrated in FIG. 9(a), a transparent base material 30e of the external tapered screen 34e is configured in a manner that an internal first surface 31e and an external second surface 32e are tapered surfaces 33 having the first tapered shape. In addition, the taper angle σ1 of the first surface 31e of the transparent base material 30e and the taper angle σ2 of the second surface 31e of the transparent base material 30e are set to similar values. Therefore, the transparent base material 30e has an even thickness in a manner that the inner periphery and the outer periphery are the tapered surfaces having the same taper angle.

In addition, the screen 40e (transmissive hologram 43) is disposed on the second surface 32e of the transparent base material 30e. More specifically, the screen 40e is disposed in a manner that a third surface 41e inside the screen 40e is in contact with the second surface 32e. A fourth surface 42e outside the screen 40e is a surface that faces an outside of the image display device 100.

As described above, in the external tapered screen 34e, the inner periphery (first surface 31e) of the transparent base material 30e serves as the inner surface 36, and the outer periphery (fourth surface 42e) of the screen 40e serves as the outer surface 35. In addition, the screen 40e having the first tapered shape is disposed outside the tapered screen 34e.

For example, the image light 21 emitted from an emission portion 20e is reflected by a reflection mirror 50e, and is incident on the first surface 31e of the transparent base material 30e at a predetermined incident angle θ. The image light 21 incident on the first surface 31e passes through a connection surface between the transparent base material 30e and the screen 40e (the second surface 32e of the transparent base material 30e and the third surface 41e of the screen 40e), and enters the screen 40e. Next, the light is diffracted by the interference pattern recorded on the screen 40e, and is output from the fourth surface 42e as diffused light 24.

The outside light is incident on the screen 40e having the first tapered shape (fourth surface 42e) in the tapered screen 34e. Therefore, for example, the outside light 4 incident on the screen 40e is reflected more downward than the case where the light is incident on the cylindrical screen or the like. This makes it possible to reduce an amount of reflection of the outside light 4 viewed by the user 3. This results in improvement in transparency of the tapered screen 34e.

In addition, the diameter of the tapered screen 34e decreases as it gets closer to the bottom. This makes it possible to reduce a difference in horizontal magnification of the image light 21 incident on the screen 40e. This results in improvement in uneven luminance in the up-down direction of the screen 40e, and the like (see FIG. 4).

The transparent base material 30e of the tapered screen 34e has an even thickness. Accordingly, the thickness of the transparent base material 30e becomes less prominent, and it is possible to achieve excellent transparency. As a result, it is possible to display a high-quality image and the like as if the image were floating in the air. As described above, even in the case where the screen 40e is disposed outside, it is possible to display a high-definition image by using the transparent base material 30e having the first tapered shape.

As illustrated in FIG. 9(b), a transparent base material 30f of a tapered screen 34f is configured in a manner that both an internal first surface 31f and an external second surface 32f are tapered surfaces 33 having the first tapered shape. In addition, a taper angle σ1 of the first surface 31f is set to an angle different from a taper angle σ2 of the second surface 32f. A screen 40f is provided on an outer tapered surface 33 (second surface 32f) of the transparent base material 30f.

The external second surface 32f of the transparent base material 30f has the first tapered shape. Therefore, the screen 40f of the tapered screen 34f has the first tapered shape. Therefore, it is possible to suppress an amount of reflection of the outside light 4 incident on the screen 40*f* and improve transparency. In addition, it is possible to reduce a difference in horizontal magnification of the image light 21 that passes through the transparent base material 30*f* and is incident on the screen 40*f*. This results in improvement in uneven luminance in the up-down direction of the tapered screen 34*f*, and the like.

In addition, a taper angle σ1 of the first surface 31*f* is set to an angle different from a taper angle σ2 of the second surface 32*f*. As a result, the transparent base material 30*f* with slanted thickness is obtained. The transparent base material 30*f* has the slanted thickness. This makes it possible to improve strength of a main body of the transparent base material 30*f*, for example. This makes it possible to easily manufacture the transparent base material 30*b*, for example.

As illustrated in FIG. 9(*c*), a tapered screen 34*g* is configured in a manner that an external second surface 32*g* is the tapered surface 33 having the first tapered shape among the first surface 31*g* and the second surface 32*g* of a transparent base material 30*g*. In addition, the first surface 31*g* is configured as a cylindrical surface. A screen 40*g* is provided on an outer tapered surface 33 (second surface 32*g*) of the transparent base material 30*g*.

The external second surface 32*g* of the transparent base material 30*g* has the first tapered shape. Therefore, the screen 40*g* of the tapered screen 34*g* has the first tapered shape. Therefore, it is possible to suppress an amount of reflection of the outside light 4 and improve transparency. In addition, it is possible to reduce a difference in horizontal magnification of the image light 21 incident on the screen 40*f*, and improve uneven luminance and the like.

As illustrated in FIG. 9(*d*), a tapered screen 34*h* is configured in a manner that an internal first surface 31*h* is the tapered surface 33 having the first tapered shape among the first surface 31*h* and the second surface 32*h* of a transparent base material 30*h*. In addition, the second surface 32*h* is configured as a cylindrical surface. A screen 40*h* is provided on an outer cylindrical surface (second surface 32*h*) of the transparent base material 30*h*.

The tapered screen 34*h* functions as a whole circumference screen having a cylindrical shape, for example. In addition, the internal first surface 31*h* has the first tapered shape. Therefore, the tapered screen 34*h* is configured in a manner that the thickness of the tapered screen 34*h* gets thinner from bottom to top of the device. This makes it possible to sufficiently improve strength of the tapered screen 34*h*, for example.

As described above, in the image display device 100 according to this embodiment, the image light 21 emitted from the emission portion 20 along the optical axis 1 is incident on the reflection mirror 50 that faces the emission portion 20. The reflection mirror 50 controls the incident angles θ of the image light 21 emitted from the emission portion 20, with respect to the screen 40. The screen 40 is disposed at at least a portion around the optical axis 1 along the tapered surface 33 of the transparent base material 30. By disposing the tapered surface 33, it is possible to improve quality of display, and it possible to display a high-quality image on the whole circumference screen or the like.

Second Embodiment

An information processing device according to a second embodiment of the present technology will be described. Hereinafter, description will be omitted or simplified with regard to structural elements and effects that are similar to the image display device described in the above embodiment.

Figure 10:
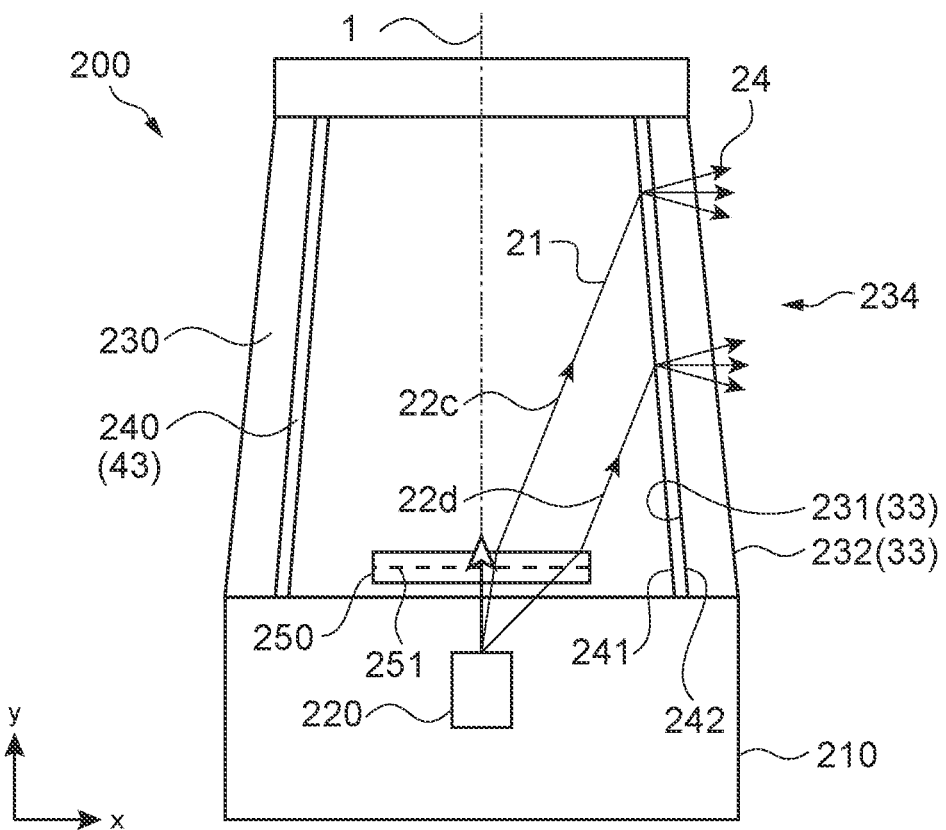
FIG. 10 is a cross-sectional view illustrating a configuration example of an image display device according to a second embodiment.

FIG. 10 is a cross-sectional view illustrating a configuration example of an image display device according to the second embodiment. The image display device 200 includes a base 210, an emission portion 220, a transparent base material 230, a screen 240, and a refraction portion 250. The base 210 has a cylindrical shape, and the base 710 is disposed at a bottom of the image display device 200.

The emission portion 220 is disposed at a substantially center of the cylindrical base 210 in a manner that the emission portion 220 faces upward. FIG. 10 schematically illustrates a situation in which image light 21 is emitted along the optical axis 1 toward an upper side of the emission portion 220. FIG. 10 schematically illustrates an inner optical path 22*c* that has a small emission angle and is near the optical axis 1, and an outer optical path 22*d* that has a large emission angle and that is distant from the optical axis 1.

The transparent base material 230 has a tubular shape that is rotationally symmetric about the optical axis 1, and is connected to the top of the base 210. The transparent base material 230 has a first surface 231 that is on a side of the optical axis 1, and a second surface 232 that is on a side opposite to the first surface 231. The first surface 231 is an inner periphery of the transparent base material 230. In addition, the second surface 232 is an outer periphery of the transparent base material 230.

The transparent base material 230 includes a tapered surface 33 having a tapered shape along the optical axis 1. In other words, the transparent base material 230 is a tapered cylinder that is tapered. In the example illustrated in FIG. 1, the transparent base material 230 is configured in a manner that both the first surface 231 and the second surface 232 are tapered surface 33. Therefore, the transparent base material 230 has a tubular shape with a tapered outer surface and a tapered inner surface.

In the embodiment, the tapered surfaces 33 have a second tapered shape in a manner that the tapered surfaces 33 narrow along a direction from the emission portion 220 toward the refraction portion 250. In other words, it can be said that the second tapered shape is an upward tapered shape (forward tapered shape) in a manner that its radius decreases toward the top of the device (outline arrow). Note that, a radius reduction direction of the second tapered shape is opposite to the first tapered direction.

In the example illustrated in FIG. 10, the transparent base material 230 is configured in a manner that both the first surface 231 and the second surface 232 are tapered surface 33 having the second tapered shape. In addition, the second tapered shape is a linear tapered shape. For example, a cross-section taken along a plane including the optical axis 1 of the transparent base material 230 has a linear shape.

In addition, with regard to the transparent base material 230 illustrated in FIG. 10, a taper angle of the first surface 231 is set to an angle similar to a taper angle of the second surface 232. In the case where the first surface 231 and the second surface 232 have a same taper angle, the transparent base material 230 has even thickness as a whole.

Note that, it is also possible to configure the tapered surfaces 33 in a manner that the first surface 231 and the second surface 232 have different taper angles, or in a manner that the tapered surface 33 is formed on one of the first surface 231 and the second surface 232. In addition, in the embodiment, one of the first surface 231 and the second surface 232 may have the first tapered shape, and the other of the first surface 231 and the second surface 232 may have the second tapered shape. Details of such other configurations will be described later.

The screen 240 is the transmissive hologram 43, and is disposed over the circumference around the optical axis 1 along the tapered surfaces 33 of the transparent base material 230. The screen 240 has a third surface 241 that is on a side of the optical axis 1, and a fourth surface 242 that is on a side opposite to the third surface 241.

In the example illustrated in FIG. 1, the screen 240 is disposed on the first surface 231. Specifically, the screen 240 is disposed in a manner that the first surface 231 inside the transparent base material 230 is in contact with the fourth surface 242 outside the screen 240. Therefore, the screen 240 has a tapered shape that is rotationally symmetric about the optical axis 1 serving as the central axis (first tapered shape). Hereinafter, the display member including the transparent base material 230 and the screen 240 is referred to as a tapered screen 234.

The refraction portion 250 has a rotationally symmetric shape. The refraction portion 250 is disposed on optical paths of the image light 21 in a manner that a central axis (axis of symmetry) of the refraction portion 250 is identical to the optical axis 1 and the refraction portion 250 faces the emission portion 220. The refraction portion 250 includes a refractive surface 251 that refracts the image light 21 emitted from the emission portion 720 and outputs the refracted light to the screen 240. In other words, the refraction portion 250 directly projects the image light 21 emitted from the emission portion 220, onto the screen 240. Note that, the refraction portion 250 may be configured by using the single refractive surface 251, or a plurality of the refractive surfaces 251. The number, type, and the like of the refractive surface 251 are not limited. According to the embodiment, the refraction portion 250 corresponds to the optical portion.

The refractive surface 251 refracts the incident image light 21 in a manner that incident angles of the image light 21 emitted from the emission portion 220 are substantially fixed with respect to the screen 240. Therefore, as illustrated in FIG. 10, the image light 21 output from the refractive surface 251 (refraction portion 250) is incident on the screen 240 as substantially parallel light beams.

The refractive surface 251 is formed on a surface of optical material having a predetermined refractive index such as crystal or glass, for example. In general, light incident on the refractive surface 251 is emitted at a fixed emission angle corresponding to an incident angle with respect to the refractive surface 251, the refractive index of the optical material, and the like. For example, it is possible to control emission angles with respect to the refractive surface 251, that is, a direction of an optical path of refracted light, by appropriately configuring the refractive surfaces 251 with regard to respective optical paths of the image light 21 emitted from the emission portion 220.

For example, an aspheric lens having an aspheric refractive surface, a Fresnel lens having a Fresnel surface, an optical element having predetermined refractive-index distribution (liquid crystal lens), or the like may be used as the refraction portion 250. In addition, for example, a refractive lens such as a concave lens or a convex lens, a parallel prism, or the like may be used as the refraction portion 250. Alternatively, the refraction portion 250 may be configured by using a combination of such optical elements. In addition, a specific configuration of the refraction portion 250 is not limited.

As illustrated in FIG. 10, the image light 21 emitted from the emission portion 220 is incident on the refraction portion 250. The image light 21 incident on the refraction portion 250 is appropriately refracted by the refraction portion 250, and is output to the screen 240 as substantially parallel light beams. Therefore, the image light 21 is incident on the screen 240 at a substantially fixed incident angle $\theta$.

For example, the image light 21 emitted from the emission portion 220 along an optical path 22c that is close to the optical axis 1 propagates near the center of the refraction portion 250 and enters an upper side of the screen 240. On the other hand, the image light 21 emitted along an optical path 22d that is far from the optical axis 1 propagates near the periphery of the refraction portion 250 and enters a lower side of the screen 240. As described above, in the case where the image light 21 is projected by using the refraction portion 250, the image light 21 is incident on an upper side of the screen 240 (tapered screen 234) as the optical path of the image light 21 gets closer to the optical axis 1.

Therefore, for example, in the case of using the cylindrical screen (see FIG. 4), the horizontal magnification (X direction) of the image light 21 increases as the image light 21 is displayed on an upper side of the cylindrical screen. As a result there is a possibility that luminance of an image displayed on the upper side of the cylindrical screen is lower than luminance of an image displayed on the lower side of the cylindrical screen. In addition, there is a possibility that the image becomes more grainy toward the top of the cylindrical screen.

On the other hand, the screen 240 illustrated in FIG. 10 is a tapered screen formed on the tapered surface 33 having the second tapered shape (first surface 231 of transparent base material 230). Therefore, the diameter of the screen 240 decreases toward the top of the screen 240. As a result, it is possible to obtain a sufficiently small difference between the horizontal magnification of the image light 21 incident on an upper side of the screen 240 and the horizontal magnification of the image light 21 incident on a lower side of the screen 240, in comparison with the case of using the cylindrical screen or the like, for example.

As a result, it is possible to sufficiently suppress the uneven luminance of the image displayed on the screen 240 in the up-down direction, or the like. In addition, it is possible to prevent an image from getting grainy at an upper side. As described above, even in the case where the image is projected by using the refraction portion 250, it is possible to suppress the uneven luminance or the like and display a high-quality image by using the tapered screen 234 in a manner that the screen 240 is formed on the tapered surface 33 having the second tapered shape.

FIG. 11 is a schematic diagram illustrating configuration examples of an internal tapered screen 234. The screen 240 (transmissive hologram 43) is provided on an inner surface of the internal tapered screen 234. FIG. 11(a) to FIG. 11(f) schematically illustrate cross-sections taken along a plane including the optical axis 1 of the image display device 200 including internal tapered screens 234a to 234f.

Figure 11A:
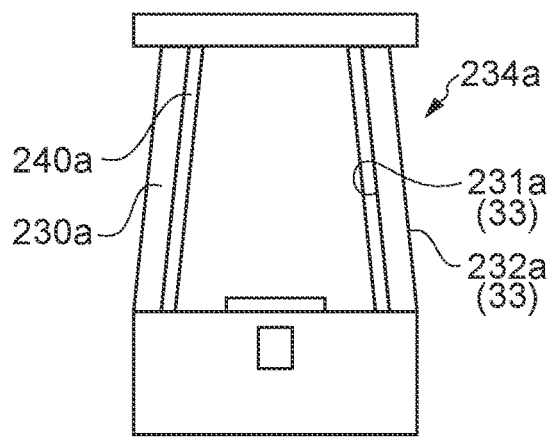
FIG. 11 is a FIGS. 11A to 11F are schematic diagrams illustrating configuration examples of an internal tapered screen.
Figure 11D:
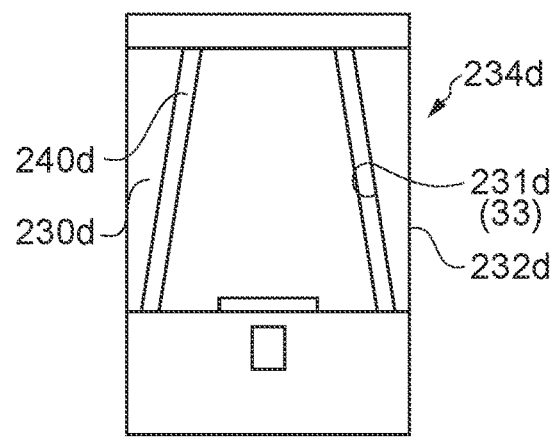
Figure 11B:
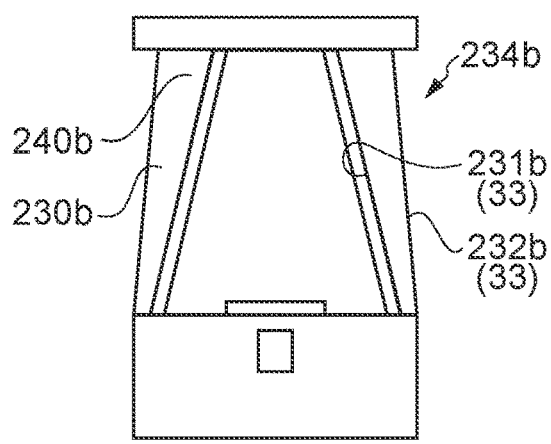
Figure 11E:
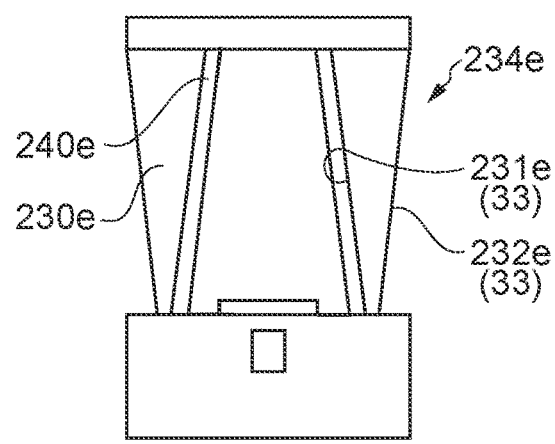
Figure 11C:
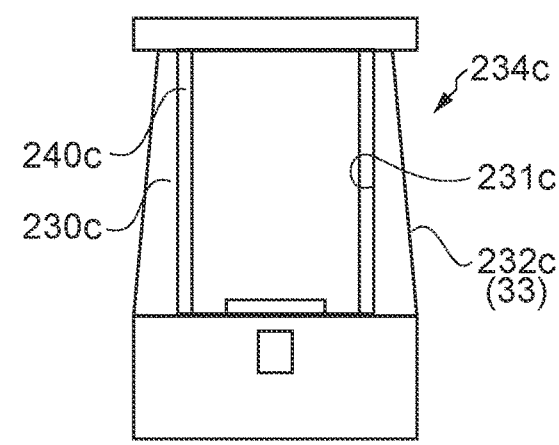
Figure 11F:
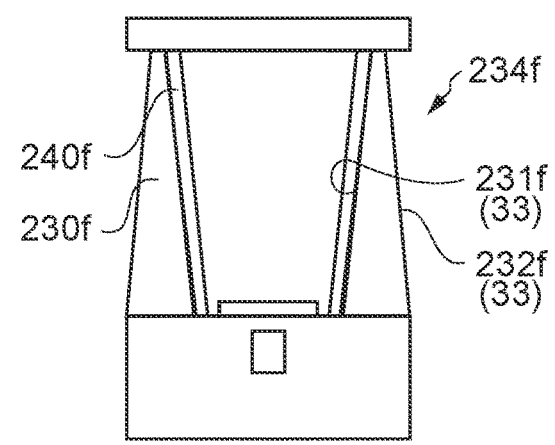

The tapered screen 234a illustrated in FIG. 11(a) is configured in a way similar to the tapered screen 234 illustrated in FIG. 10, for example. In other words, the tapered surface 33 having the second tapered shape is formed on both an internal first surface 231a and an external second surface 232a of the transparent base material 230a. In addition, an interior taper angle of the first surface 231a is set to an angle similar to an exterior taper angle of the second surface 232a. A screen 240a is disposed on the first surface 231a, and the screen 240a has the second tapered shape.

For example, because the first surface 231*a* (screen 240*a*) has the second tapered shape, the tapered screen 234*a* is capable of suppressing the uneven luminance in the up-down direction of the screen 240*a*, or the like, as described above. In addition, the interior taper angle and the exterior taper angle are set to similar angles. Therefore, the transparent base material 230*a* has an even thickness, and it is possible to improve transparency.

In addition, it can be said that the second tapered shape is a shape in which the top of the tapered surface 33 tilts toward the optical axis 1. For example, it is possible to configure a screen that is easily viewed from above the image display device 200 when an image is displayed on such a tapered surface 33.

In addition, in the embodiment, the image light 21 emitted from the bottom to the top of the image display device 200 is incident on the screen 240. In other words, the image light 21 that propagates upward is projected onto the screen 240*a*. Such a configuration makes it possible to easily increase luminance or the like of the image light 21 that propagates toward an obliquely upward direction of the device. This makes it possible to easily improve the luminance of the image in the case where the image displayed on the screen 240*a* having the second tapered shape is observed from above, or other cases.

As illustrated in FIG. 11(*b*), a tapered screen 234*b* is configured in a manner that both an internal first surface 231*b* and an external second surface 232*b* of the transparent base material 230*b* are tapered surfaces 33 having the second tapered shape. In addition, an interior taper angle of the first surface 231*b* is set to an angle different from an exterior taper angle of the second surface 232*b*. A screen 240*b* is disposed on the first surface 231*b*, and the screen 240*b* has the second tapered shape.

The first surface 231*b* (screen 240*b*) has the second tapered shape. Therefore, it is possible to suppress uneven luminance or the like of the tapered screen 234*b*. In addition, the interior taper angle and the exterior taper angle are set to different angles. Therefore, the transparent base material 230*a* has an uneven thickness. This makes it possible to improve strength of the transparent base material 230*b*, and easily manufacture the transparent base material 230*b* through the injection molding or the like.

As illustrated in FIG. 11(*c*), a tapered screen 234*c* is configured in a manner that a second surface 232*c* is the tapered surface 33 having the second tapered shape among the first surface 231*c* and the second surface 232*c* of a transparent base material 230*c*. In addition, a cylindrical surface is formed on the internal first surface 231*c*. A screen 240*c* is disposed on the first surface 231*c*, and the screen 240*c* has the cylindrical shape.

For example, the second surface 232*c* has the second tapered shape, and the first surface 231*c* has the cylindrical shape. Therefore, the tapered screen 234*c* is configured in a manner that the thickness of the tapered screen 34234*c* gets thinner from bottom to top of the device. This makes it possible to improve strength of the tapered screen 234*h*, for example. In addition, because the first surface 231*c* has the cylindrical shape, it is possible to display an image on the display surface that is not tilted.

As illustrated in FIG. 11(*d*), a tapered screen 234*d* is configured in a manner that an internal first surface 231*d* is the tapered surface 33 having the second tapered shape among the first surface 231*d* and the second surface 232*d* of a transparent base material 230*d*. In addition, a cylindrical surface is formed on the external second surface 232*d*. A screen 240*d* is disposed on the first surface 231*d*, and the screen 240*d* has the second tapered shape.

The first surface 231*d* (screen 240*d*) has the second tapered shape. Therefore, it is possible to suppress uneven luminance or the like of the tapered screen 234*d*. In addition, because the second surface 232*d* has the cylindrical shape, it is possible to obtain the image display device 200 that has an appearance with no slope.

As illustrated in FIG. 11(*e*), a tapered screen 234*e* is configured in a manner that an internal first surface 231*e* of a transparent base material 230*e* is the tapered surface 33 having the second tapered shape. In addition, the tapered surface 33 having the first tapered shape is formed on the external second surface 232*e*. A screen 240*e* is disposed on the first surface 231*e*, and the screen 240*e* has the second tapered shape.

For example, the first surface 231*e* (screen 240*e*) has the second tapered shape. Therefore, it is possible to suppress uneven luminance or the like of the tapered screen 234*e*. In addition, the second surface 232*e* has the first tapered shape. Therefore, it is possible to suppress an amount of reflection of the outside light 4 or the like incident from above the device, and it is possible to improve transparency.

As illustrated in FIG. 11(*f*), a tapered screen 234*f* is configured in a manner that an internal first surface 231*f* of a transparent base material 230*f* is the tapered surface 33 having the first tapered shape. In addition, the tapered surface 33 having the second tapered shape is formed on the external second surface 232*f*. A screen 240*f* is disposed on the first surface 231*f*, and the screen 240*f* has the first tapered shape.

For example, the second surface 232*f* has the second tapered shape, and the first surface 231*f* (screen 240*f*) has the first tapered shape. Therefore, the tapered screen 234*f* is configured in a manner that the thickness of the tapered screen 234*f* gets thinner from bottom to top of the device. This makes it possible to improve strength of the tapered screen 234*h*, and it is possible to configure the tapered screen 234*h* whose center of mass is on a lower side. This makes it possible to improve stability of the device.

FIG. 12 is a schematic diagram illustrating configuration examples of an external tapered screen 234. The screen 240 (transmissive hologram 43) is provided on the outer surface of the external tapered screen 234. FIG. 12(*a*) to FIG. 12(*f*) schematically illustrate cross-sections taken along a plane including the optical axis 1 of the image display device 200 including external tapered screens 234*g* to 234*l*.

Note that, for example, the tapered screens 234*g* to 234*l* are configured in ways similar to the case where the screen 240 is disposed on the external second surface 232 of the transparent base material 230 with regard to the above-described tapered screens 234*a* to 234*f* described above with reference to FIG. 11.

As illustrated in FIG. 12(*a*), a tapered screen 234*g* is configured in a manner that both an internal first surface 231*g* and an external second surface 232*g* of the transparent base material 230*g* are tapered surfaces 33 having the second tapered shape. In addition, an interior taper angle of the first surface 231*g* is set to an angle different from an exterior taper angle of the second surface 232*g*. A screen 240*g* is disposed on the second surface 232*g*, and the screen 240*g* has the second tapered shape.

For example, the second surface 232*g* (screen 240*g*) has the second tapered shape. Therefore, it is possible to suppress uneven luminance or the like of the tapered screen 234*g*. In addition, the interior taper angle and the exterior taper angle are set to similar angles. Therefore, the transparent base material 230g has an even thickness. This results in improvement in transparency of the tapered screen 234g.

Figure 12A:
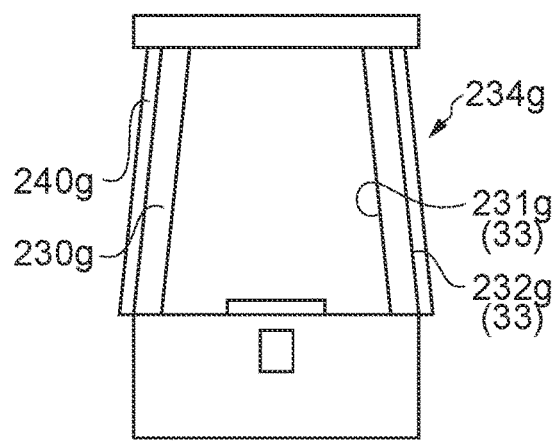
FIG. 12 is a FIGS. 12A to 12F are schematic diagrams illustrating configuration examples of an external tapered screen.
Figure 12D:
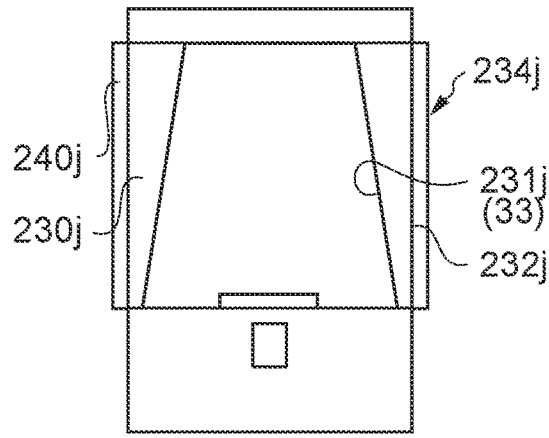
Figure 12B:
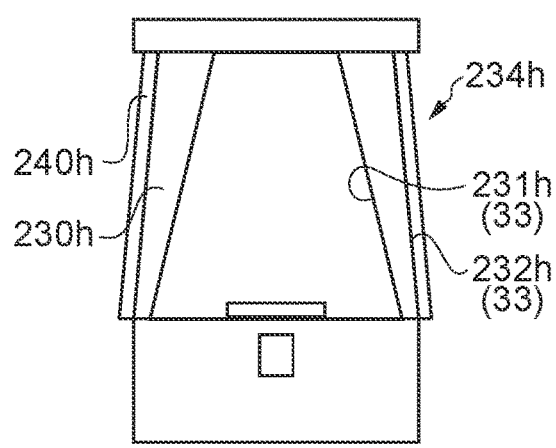

As illustrated in FIG. 12(b), a tapered screen 234h is configured in a manner that both an internal first surface 231h and an external second surface 232h of the transparent base material 230h are tapered surfaces 33 having the second tapered shape. In addition, an interior taper angle of the first surface 231h is set to an angle different from an exterior taper angle of the second surface 232h. A screen 240b is disposed on the second surface 232h, and the screen 240b has the second tapered shape.

For example, the second surface 232h (screen 240h) has the second tapered shape. Therefore, it is possible to suppress uneven luminance or the like of the tapered screen 234h. In addition, the interior taper angle and the exterior taper angle are set to different angles. Therefore, the transparent base material 230h has an uneven thickness. This makes it possible to improve strength of the transparent base material 230h, and easily manufacture the transparent base material 230h through the injection molding or the like.

Figure 12E:
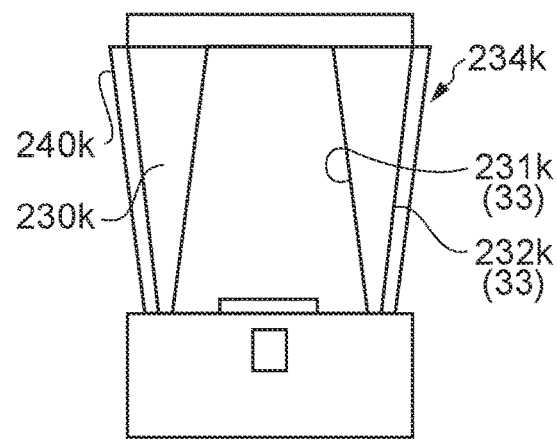
Figure 12C:
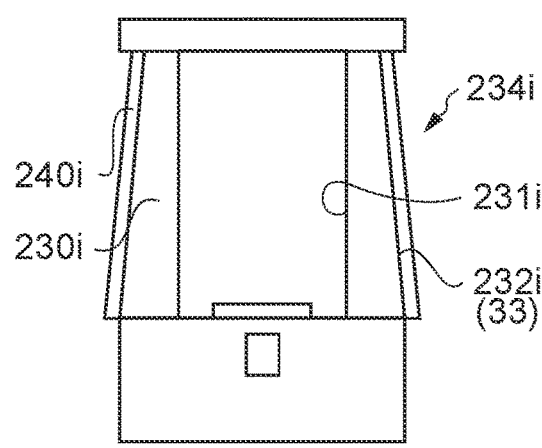

As illustrated in FIG. 12(c), a tapered screen 234i is configured in a manner that a second surface 232i is the tapered surface 33 having the second tapered shape among the first surface 231i and the second surface 232i of a transparent base material 230i. In addition, a cylindrical surface is formed on the internal first surface 231i. A screen 240i is disposed on the second surface 232i, and the screen 240i has the second tapered shape.

For example, the second surface 232i (screen 240i) has the second tapered shape. Therefore, it is possible to suppress uneven luminance or the like of the tapered screen 234i. In addition, the first surface 231i has the cylindrical shape. Therefore, the tapered screen 234i is configured in a manner that the thickness of the tapered screen 234i gets thinner from bottom to top of the device. This makes it possible to improve strength of the tapered screen 234i, for example.

As illustrated in FIG. 12(d), a tapered screen 234j is configured in a manner that an internal first surface 231j is the tapered surface 33 having the second tapered shape among the first surface 231j and the second surface 232j of a transparent base material 230j. In addition, a cylindrical surface is formed on the external second surface 232j. A screen 240j is disposed on the first surface 231j, and the screen 240j has the cylindrical shape.

For example, the first surface 231j has the second tapered shape, and the second surface 232j has the cylindrical shape. Therefore, it is possible to improve strength of the tapered screen 234j, for example. In addition, because the second surface 232j has the cylindrical shape, it is possible to display an image on the display surface that is not tilted.

As illustrated in FIG. 12(e), a tapered screen 234k is configured in a manner that an internal first surface 231k of a transparent base material 230k is the tapered surface 33 having the second tapered shape. In addition, the tapered surface 33 having the first tapered shape is formed on the external second surface 232k. A screen 240k is disposed on the second surface 232k, and the screen 240k has the second tapered shape.

For example, the second surface 232e (screen 240e) of the tapered screen 234k has the first tapered shape. Therefore, it is possible to suppress an amount of reflection of the outside light 4 or the like incident from above the device, and it is possible to improve transparency.

Figure 12F:
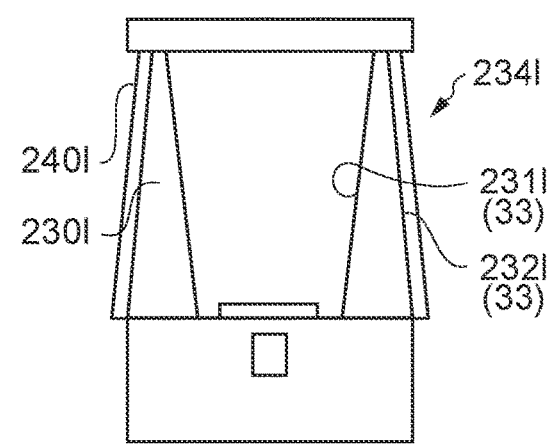

As illustrated in FIG. 12(f), a tapered screen 234l is configured in a manner that an internal first surface 231l of a transparent base material 230l is the tapered surface 33 having the first tapered shape. In addition, the tapered surface 33 having the second tapered shape is formed on the external second surface 232l. A screen 240l is disposed on the second surface 232l, and the screen 240l has the second tapered shape.

For example, the second surface 232l (screen 240l) has the second tapered shape. Therefore, it is possible to suppress uneven luminance or the like of the tapered screen 234l. In addition, for example, the inner and outer surfaces of the transparent base material 230 have the second tapered shape and the first tapered shape. Therefore, the thickness of the device gets thinner from bottom to top of the device, and it is possible to configure the tapered screen 234l whose center of mass is on a lower side.

Other Embodiments

The present disclosure is not limited the above-described embodiments. It is possible to achieve various kinds of other embodiments.

In the above-described embodiments, the transmissive HOE (transmissive hologram) is used. The present disclosure is not limited thereto. For example, a reflective HOE (reflective hologram) may be used. The reflective hologram is a hologram that diffracts light incident at a predetermined incident angle in a manner that the light is output from a surface on which the light has been incident, for example. In this case, the user views light that is diffracted by a back-side screen and passes through a front-side screen of a whole circumference screen. This makes it possible to provide an image or the like displayed on a concave screen, for example. For example, it is possible to use such a configuration.

In addition, the present disclosure is not limited to the screens using the diffractive optical element for diffracting light. Other screens may be used. For example, a Fresnel screen or the like may be used as a screen. The Fresnel screen is a refractive screen including a Fresnel pattern, for example. For example, a tapered screen may be obtained by attaching a sheet-like Fresnel screen to a transparent base material including a tapered surface.

In the above-described embodiments, the screen is disposed over the circumference around the optical axis of the emission portion. The present disclosure is not limited to such a whole circumference screen. A screen disposed at a portion of the circumference around the optical axis may be used. In other words, a screen that partially covers the circumference around the optical axis may be configured. For example, it is possible to configure a tapered screen having a semicircular cross-section or an arc-like cross-section. In addition, instead of the shapes based on a circular shape, it is possible to configure a tapered screen having an oval cross-section or a hyperbolic cross-section.

In the above embodiments, reflection mirror including a reflection surface formed on a parabola is used. The shape and the like of the reflection surface is not limited. For example, it is possible to use any reflection surface capable of reflecting image light in accordance with the shape and the like of the screen. For example, the reflection surface may be configured as an aspheric surface (such as a free-form surface) that is different from a paraboloid. The free-form surface is configured in a manner that an incident angle θ of the image light on the screen is substantially fixed. Such a curved surface can be designed on the basis of optical path simulation or the like, for example.

In the present disclosure, the terms "same", "similar", "equal", "orthogonal", and the like are used as concepts that include meanings of "substantially same", "substantially equal", "substantially orthogonal", and the like. For example, they include states varied within a predetermined range (such as within a range of ±10%) from criterial state such as "perfectly same", "perfectly equal", "perfectly orthogonal", and the like.

Out of the feature parts according to the present technology described above, at least two feature parts can be combined. That is, the various feature parts described in the embodiments may be arbitrarily combined irrespective of the embodiments. Further, various effects described above are merely examples and are not limited, and other effects may be exerted.

Note that, the present technology may also be configured as below.

(1) An image display device including:
- an emission portion that emits image light along a predetermined axis;
- a transparent base material that includes a tapered surface having a tapered shape along the predetermined axis;
- an irradiation target disposed at at least a part around the predetermined axis along the tapered surface; and
- an optical portion that controls an incident angle of the image light on the irradiation target, the image light having been emitted from the emission portion, the optical portion being disposed in a manner that the optical portion faces the emission portion on the basis of the predetermined axis.

(2) The image display device according to (1), in which
the transparent base material has a first surface that is on a side of the predetermined axis, and a second surface that is on a side opposite to the first surface, and
the tapered surface is formed on at least one of the first surface or the second surface.

(3) The image display device according to (2),
in which the transparent base material supports the irradiation target.

(4) The image display device according to (3),
in which the irradiation target is disposed on at least one of the first surface or the second surface.

(5) The image display device according to any one of (2) to (4),
in which the tapered surface has a first tapered shape in a manner that the tapered surface expands along a direction from the emission portion toward the optical portion.

(6) The image display device according to (5),
in which the transparent base material is configured in a manner that both the first surface and the second surface are the tapered surfaces having the first tapered shape.

(7) The image display device according to (6), in which
the first tapered shape is a linear tapered shape, and
a taper angle of the first surface is set to an angle similar to a taper angle of the second surface.

(8) The image display device according to (6), in which
the first tapered shape is a linear tapered shape, and
a taper angle of the first surface is set to an angle different from a taper angle of the second surface.

(9) The image display device according to (5),
in which the transparent base material is configured in a manner that one of the first surface and the second surface is the tapered surface having the first tapered shape.

(10) The image display device according to any one of (5) to (9),
in which the optical portion includes a reflection surface that reflects the image light toward the irradiation target, the image light having been emitted from the emission portion.

(11) The image display device according to any one of (2) to (10),
in which the tapered surface has a second tapered shape in a manner that the tapered surface narrows along a direction from the emission portion toward the optical portion.

(12) The image display device according to (11),
in which the optical portion includes a refractive surface that refracts the image light emitted from the emission portion and emits the refracted light toward the irradiation target.

(13) The image display device according to any one of (1) to (12),
in which the optical portion sets the incident angle of the image light on the irradiation target to be substantially fixed.

(14) The image display device according to any one of (1) to (13),
in which the irradiation target is disposed over a circumference around the predetermined axis.

(15) The image display device according to any one of (1) to (14),
in which the irradiation target is a screen using a diffractive optical element.

(16) The image display device according to any one of (1) to (15),
in which the irradiation target is a sheet-like hologram screen.

(17) The image display device according to any one of (1) to (15),
in which the irradiation target is one of a volume hologram screen obtained by exposing photosensitive material applied to the transparent base material, and a relief hologram screen obtained by processing the transparent base material.

(18) The image display device according to any one of (1) to (14),
in which the irradiation target is a Fresnel screen.

REFERENCE SIGNS LIST 1 optical axis
4 outside light
20, 220 emission portion
21 image light
24 diffused light
30, 30a to 30h, 230, 230a to 230l transparent base material
31, 31a to 31h, 231, 231a to 231l first surface
32, 32a to 32h, 232, 232a to 232l second surface
33 tapered surface
34, 34a to 34h, 234, 234a to 234l tapered screen
40, 40a to 40h, 240, 240a to 240l screen
43 transmissive hologram
50 reflection mirror
250 refraction portion
100, 200 image display device

The invention claimed is:

1. An image display device comprising:
an emission portion that emits image light along a predetermined axis;

a transparent base material that includes a tapered surface having a tapered shape along the predetermined axis;

an irradiation target disposed at least a part around the predetermined axis along the tapered surface; and an optical portion that controls an incident angle of the image light on the irradiation target, the image light having been emitted from the emission portion, the optical portion being disposed in a manner that the optical portion faces the emission portion on a basis of the predetermined axis wherein the transparent base material has a first surface that is on a side of the predetermined axis, and a second surface that is on a side opposite to the first surface, and the tapered surface is formed on at least one of the first surface or the second surface, and wherein the tapered surface has a first tapered shape in a manner that the tapered surface expands along a direction from the emission portion toward the optical portion.

2. The image display device according to claim 1, wherein the transparent base material supports the irradiation target.

3. The image display device according to claim 2, wherein the irradiation target is disposed on at least one of the first surface or the second surface.

4. The image display device according to claim 1, wherein the transparent base material is configured in a manner that both the first surface and the second surface are the tapered surfaces having the first tapered shape.

5. The image display device according to claim 4, wherein the first tapered shape is a linear tapered shape, and a taper angle of the first surface is set to an angle similar to a taper angle of the second surface.

6. The image display device according to claim 4, wherein the first tapered shape is a linear tapered shape, and a taper angle of the first surface is set to an angle different from a taper angle of the second surface.

7. The image display device according to claim 1, wherein the transparent base material is configured in a manner that one of the first surface and the second surface is the tapered surface having the first tapered shape.

8. The image display device according to claim 1, wherein the optical portion includes a reflection surface that reflects the image light toward the irradiation target, the image light having been emitted from the emission portion.

9. The image display device according to claim 1, wherein the tapered surface has a second tapered shape in a manner that the tapered surface narrows along a direction from the emission portion toward the optical portion.

10. The image display device according to claim 1, wherein the optical portion sets the incident angle of the image light on the irradiation target to be substantially fixed.

11. The image display device according to claim 1, wherein the irradiation target is disposed over a circumference around the predetermined axis.

12. The image display device according to claim 1, wherein the irradiation target is a screen using a diffractive optical element.

13. The image display device according to claim 1, wherein the irradiation target is a sheet-like hologram screen.

14. The image display device according to claim 1, wherein the irradiation target is a Fresnel screen.

15. An image display device comprising:

an emission portion that emits image light along a predetermined axis;

a transparent base material that includes a tapered surface having a tapered shape along the predetermined axis;

an irradiation target disposed at least a part around the predetermined axis along the tapered surface; and an optical portion that controls an incident angle of the image light on the irradiation target, the image light having been emitted from the emission portion, the optical portion being disposed in a manner that the optical portion faces the emission portion on a basis of the predetermined axis, wherein the transparent base material has a first surface that is on a side of the predetermined axis, and a second surface that is on a side opposite to the first surface, and the tapered surface is formed on at least one of the first surface or the second surface, wherein the tapered surface has a second tapered shape in a manner that the tapered surface narrows along a direction from the emission portion toward the optical portion, and wherein the optical portion includes a refractive surface that refracts the image light emitted from the emission portion and emits the refracted light toward the irradiation target.

16. An image display device comprising:

an emission portion that emits image light along a predetermined axis;

a transparent base material that includes a tapered surface having a tapered shape along the predetermined axis;

an irradiation target disposed at least a part around the predetermined axis along the tapered surface; and an optical portion that controls an incident angle of the image light on the irradiation target, the image light having been emitted from the emission portion, the optical portion being disposed in a manner that the optical portion faces the emission portion on a basis of the predetermined axis, wherein the irradiation target is one of a volume hologram screen obtained by exposing photosensitive material applied to the transparent base material, and a relief hologram screen obtained by processing the transparent base material.

* * * * *